United States Patent [19]
Clark

[11] Patent Number: 6,142,942
[45] Date of Patent: Nov. 7, 2000

[54] ULTRASOUND IMAGING SYSTEM AND METHOD EMPLOYING AN ADAPTIVE FILTER

[75] Inventor: David W Clark, Windham, N.H.

[73] Assignee: Agilent Technologies, Inc., Palo Alto, Calif.

[21] Appl. No.: 09/274,195

[22] Filed: Mar. 22, 1999

[51] Int. Cl.[7] .................................................. A61B 8/00
[52] U.S. Cl. ........................................................... 600/443
[58] Field of Search ................................... 600/437, 443, 600/447

[56] References Cited

U.S. PATENT DOCUMENTS

| | | | |
|---|---|---|---|
| 4,751,846 | 6/1988 | Dousse | 73/602 |
| 4,783,839 | 11/1988 | Bomber | 382/54 |
| 5,396,285 | 3/1995 | Hedberg et al. | 348/163 |
| 5,739,691 | 4/1998 | Hoenninger, III | 324/322 |
| 5,841,889 | 11/1998 | Seyed-Bolorforosh | 382/128 |
| 5,911,160 | 6/1999 | Abe et al. | 73/602 |
| 5,919,137 | 7/1999 | Finger et al. | 600/443 |
| 5,933,540 | 8/1999 | Lakshminarayanan et al. | 382/260 |
| 5,961,461 | 10/1999 | Mo et al. | 600/443 |
| 5,976,087 | 11/1999 | Resnick et al. | 600/443 |
| 5,995,567 | 11/1999 | Cioffi et al. | 375/346 |

*Primary Examiner*—Francis J. Jaworski

[57] ABSTRACT

An ultrasound imaging system is provided with an adaptive filter for transforming an input signal to produce an output signal having one or more desired signal statistics (e.g., signal-to-noise ratio, Gaussian function specification, etc.). The adaptive filter includes a digital filter configured to receive input signals and produce output signals. The adaptive filter exhibits a transfer function H defined by one or more coefficients C. A controller is configured to generate the filter coefficients based upon one or more signal constraints that are provided to the controller by a user and a sample signal that exhibits one or more sample signal statistics and that is communicated to the digital filter. The controller communicates the filter coefficients to the adaptive filter. The filter coefficients cause the adaptive filter to transform input data, based upon the transfer function H(C), to produce output data exhibiting (at least approximately) the one or more desired signal statistics, the desired signal statistics based upon the sample signal statistics and the constraints. Several different coefficient sets may be utilized in the adaptive filter for different object parts (e.g., blood, tissue, etc.) to be imaged. Furthermore, the adaptive filter may be operated by a designer so as to preset the coefficients, periodically initiated by a user/operator to reset the coefficients, and/or automatically initiated by the system, perhaps periodically or upon detection of a certain event, during operation to reset the coefficients.

24 Claims, 14 Drawing Sheets

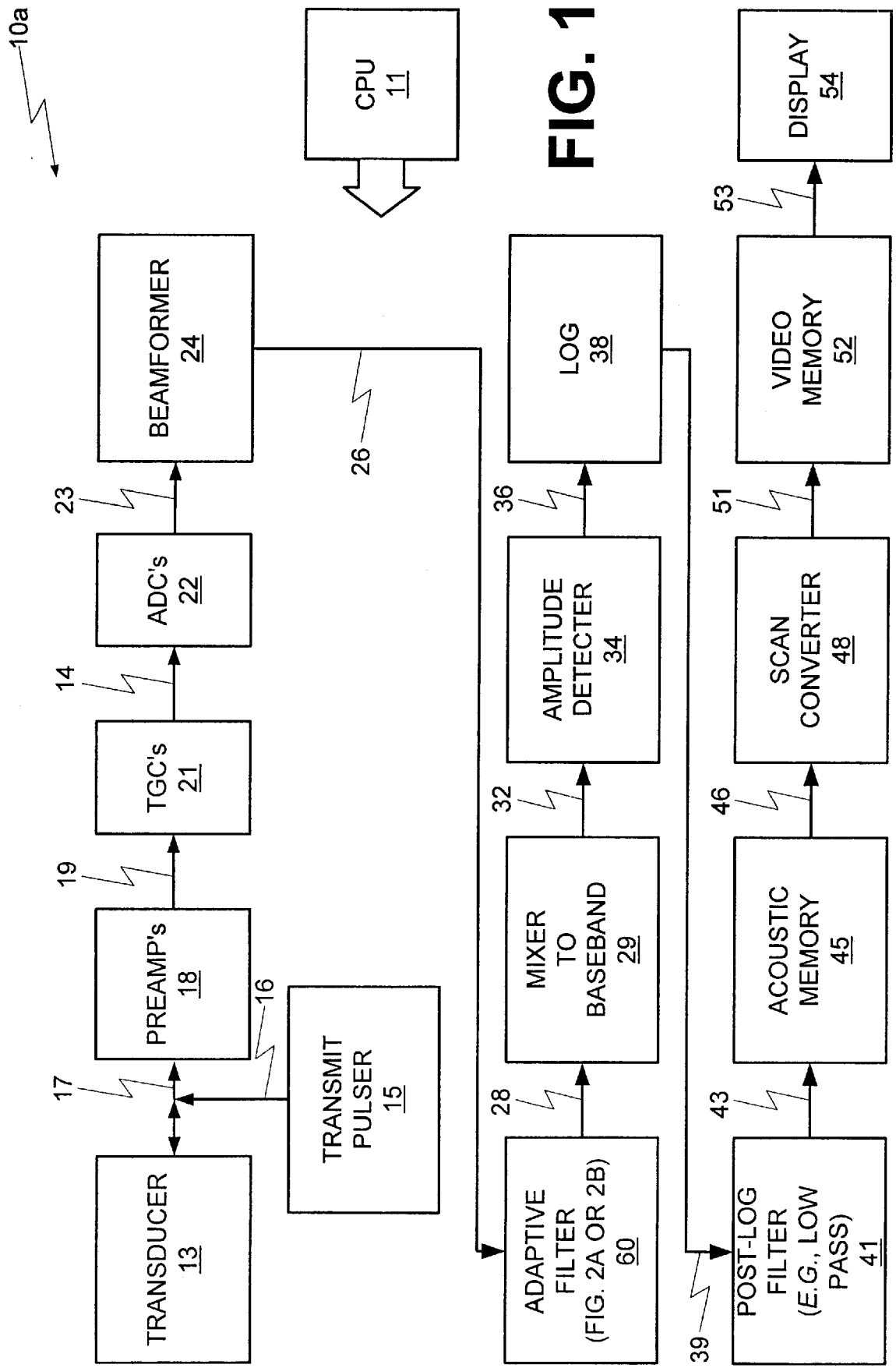

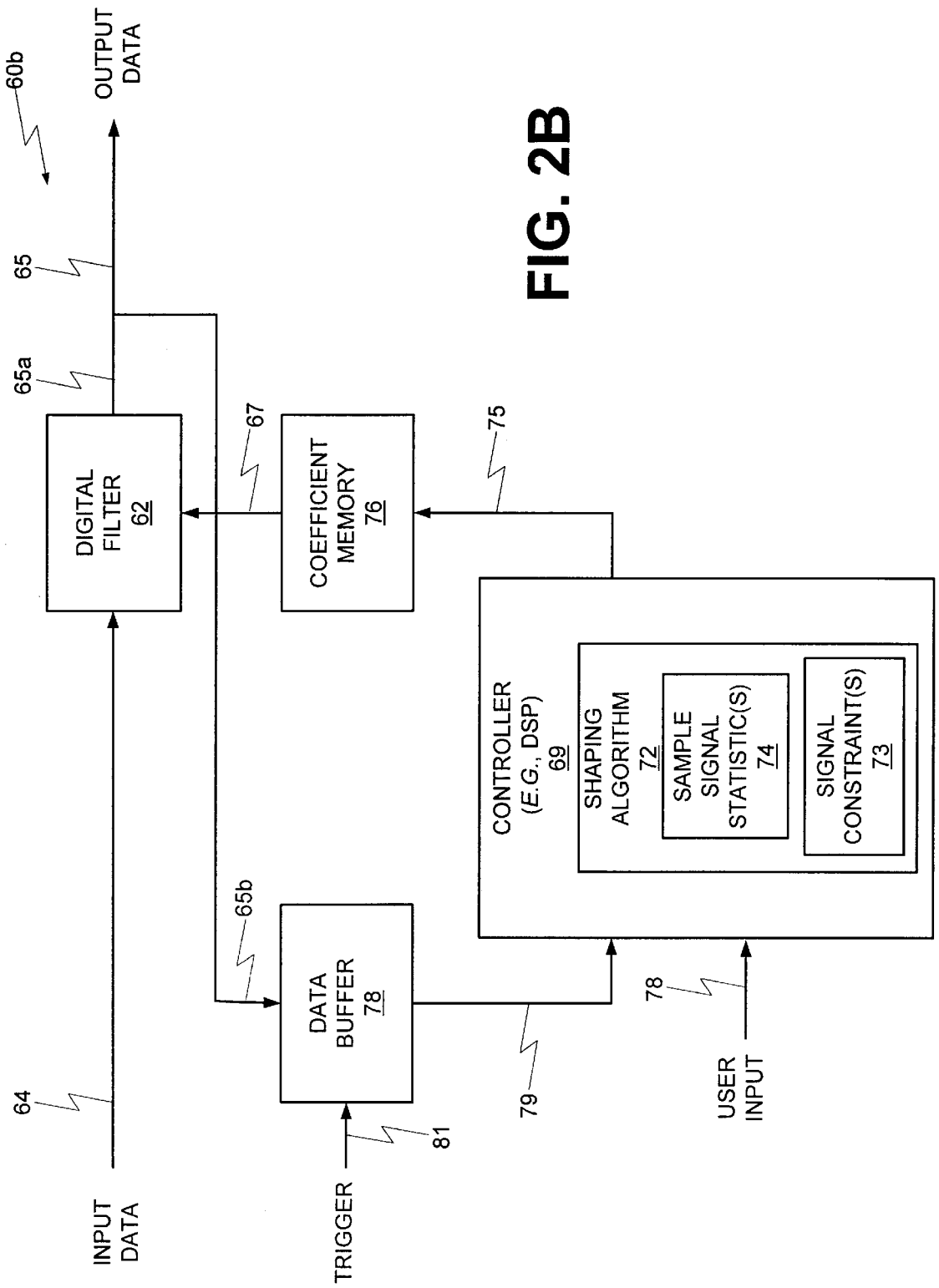

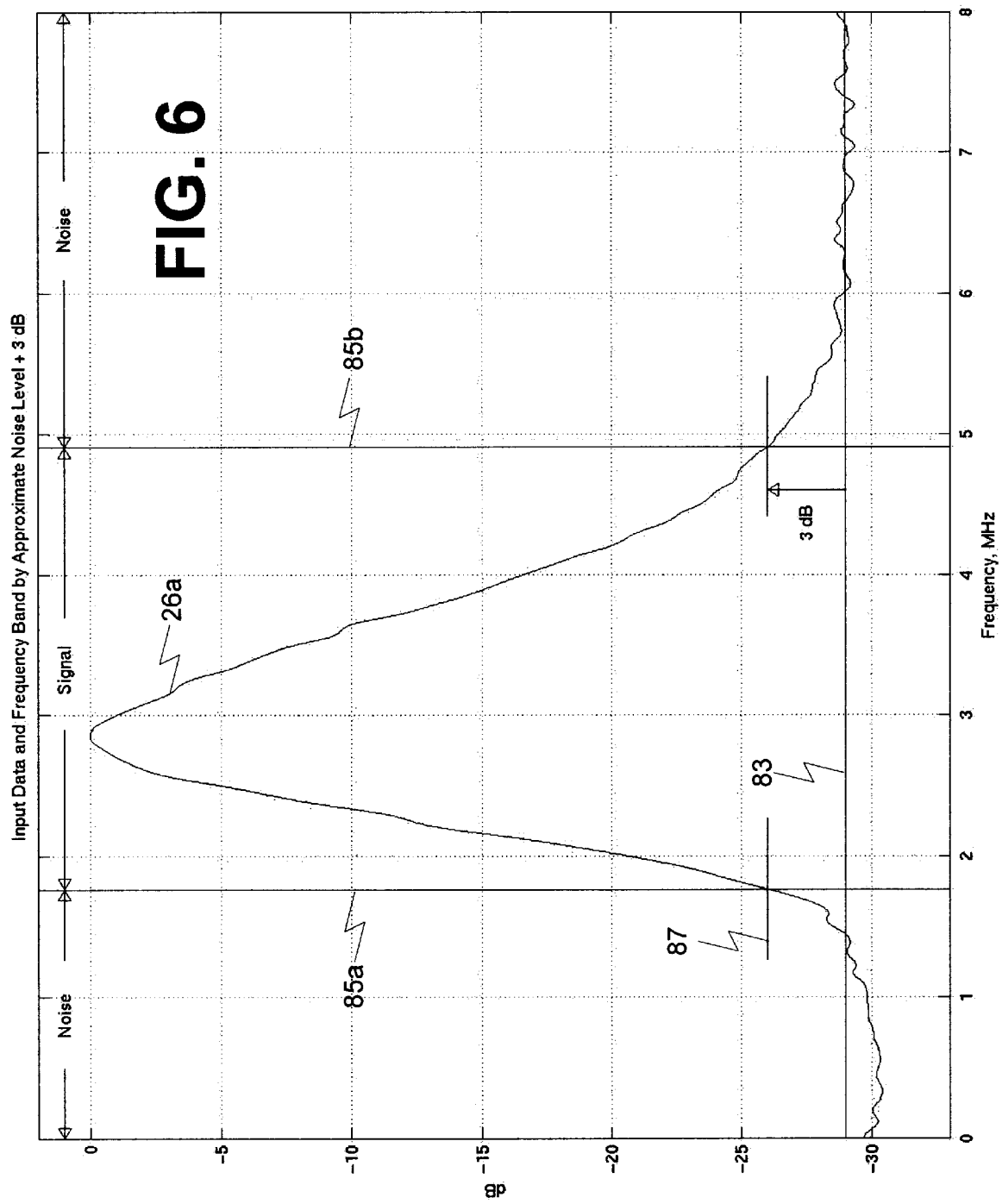

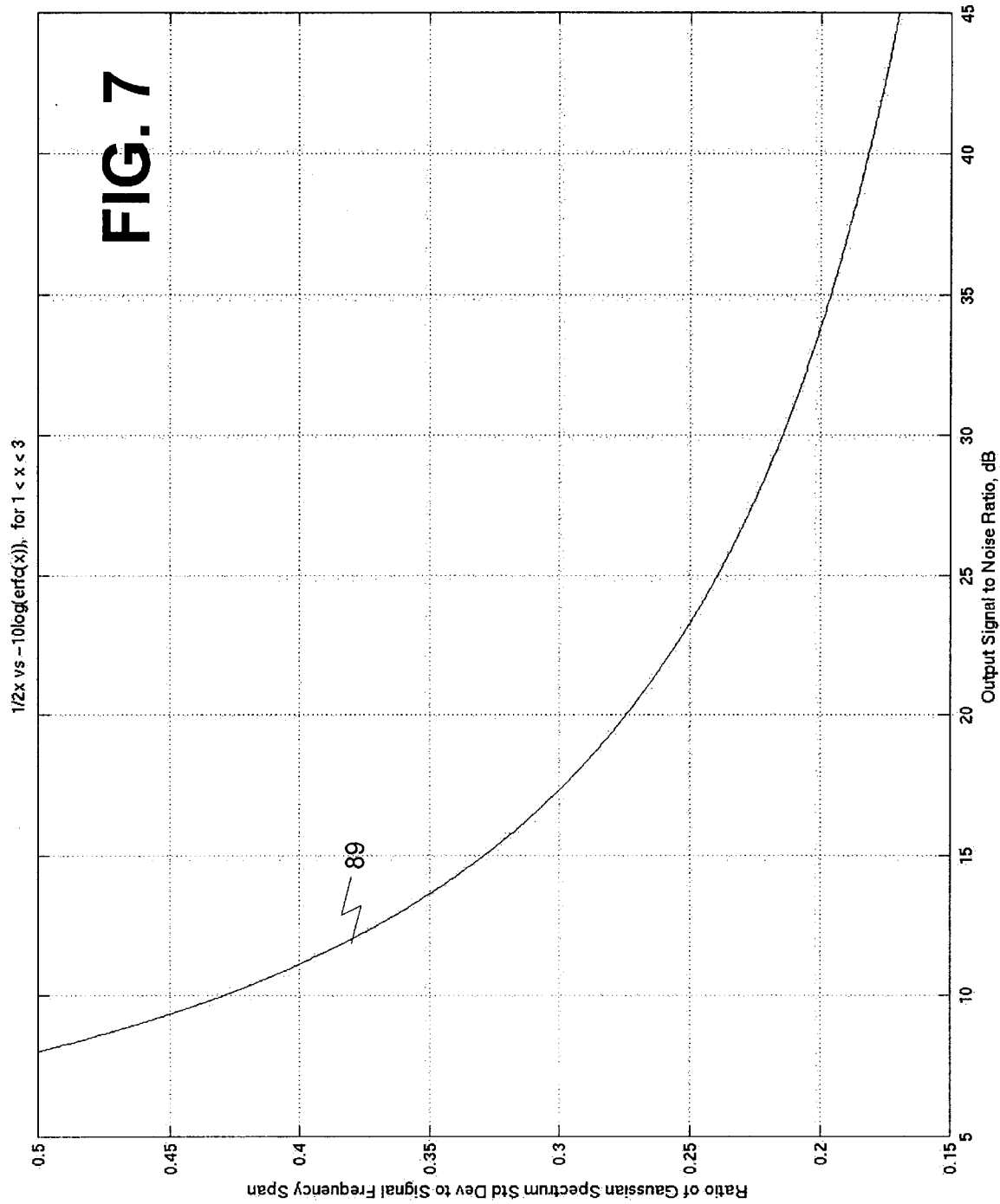

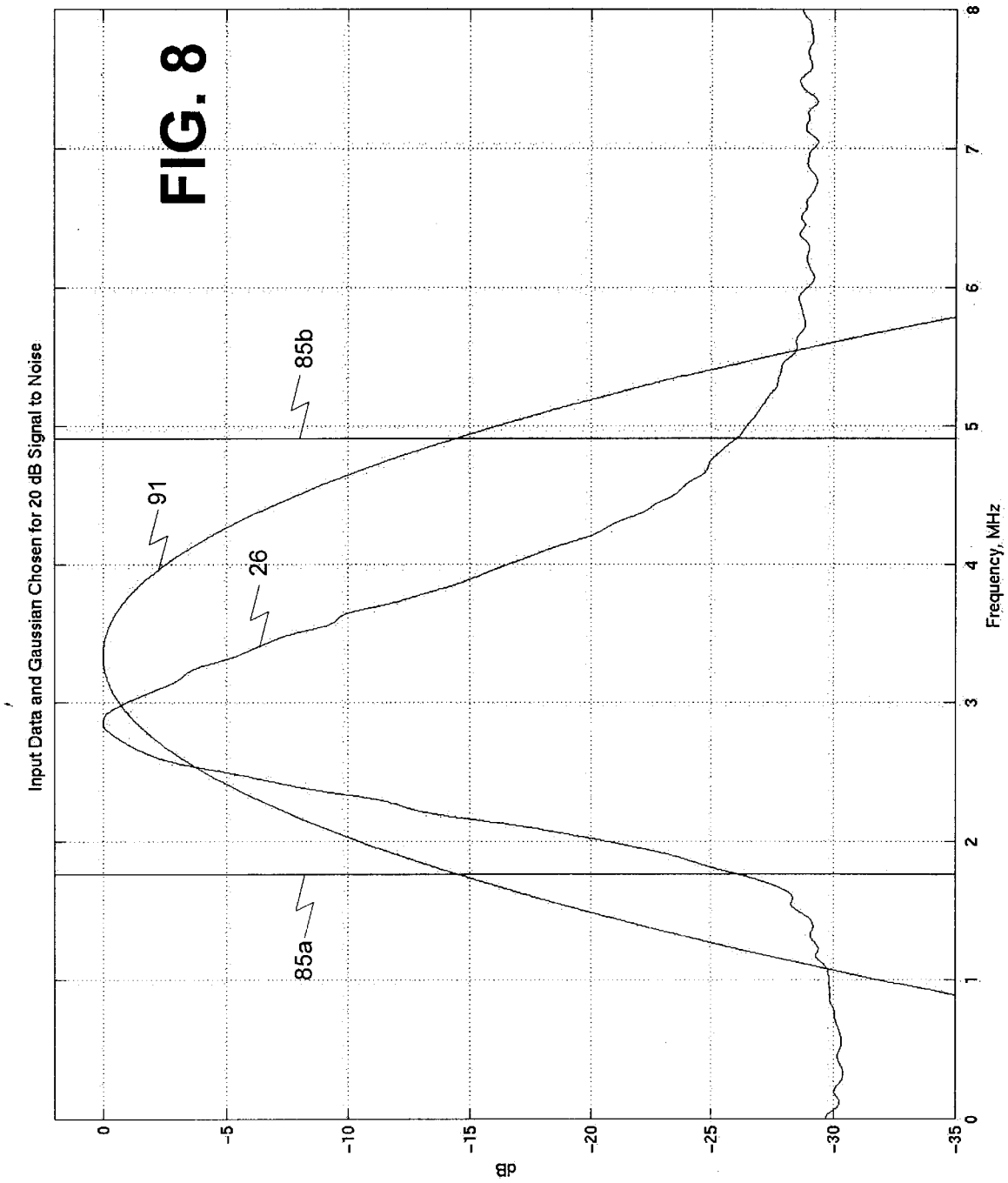

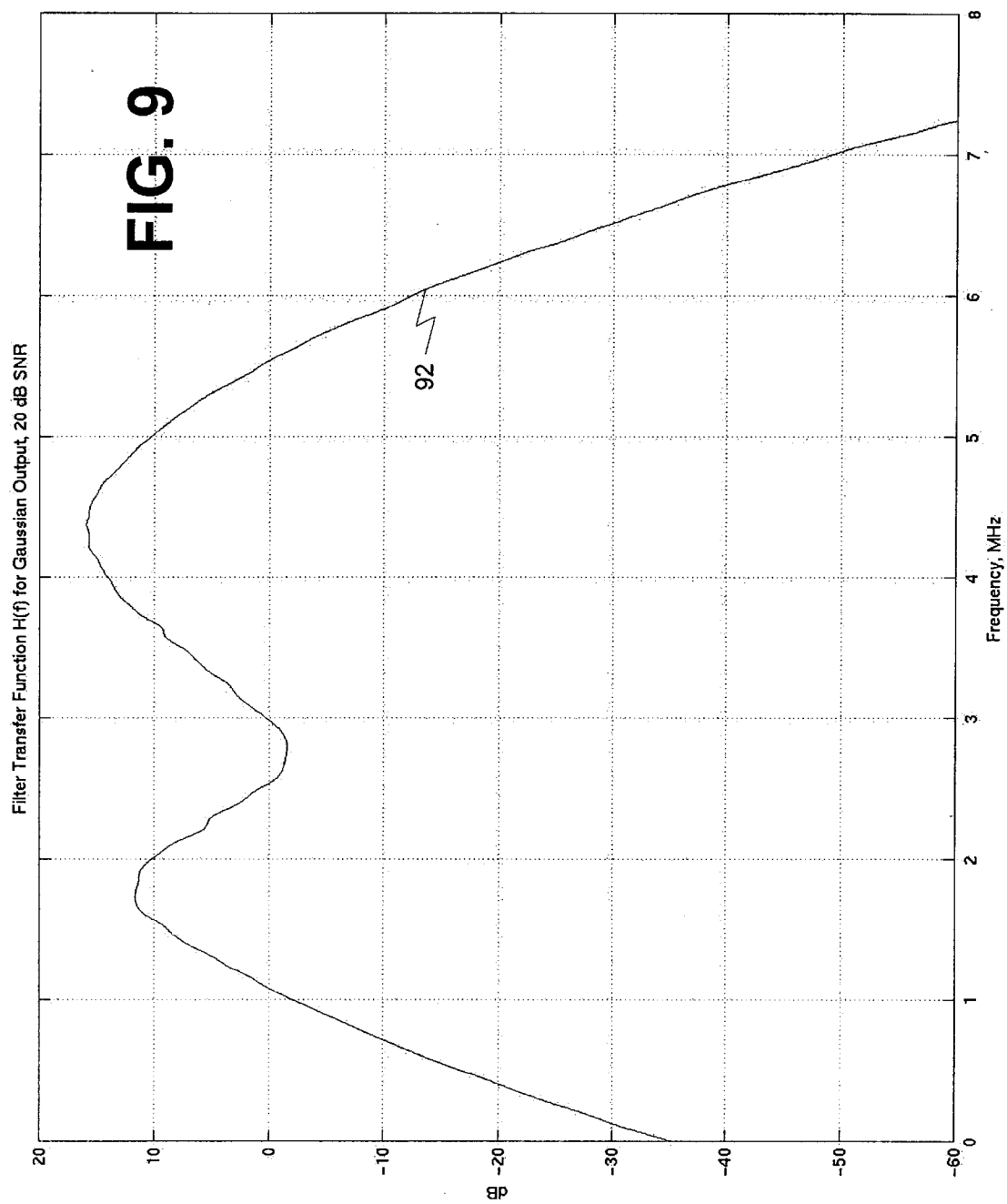

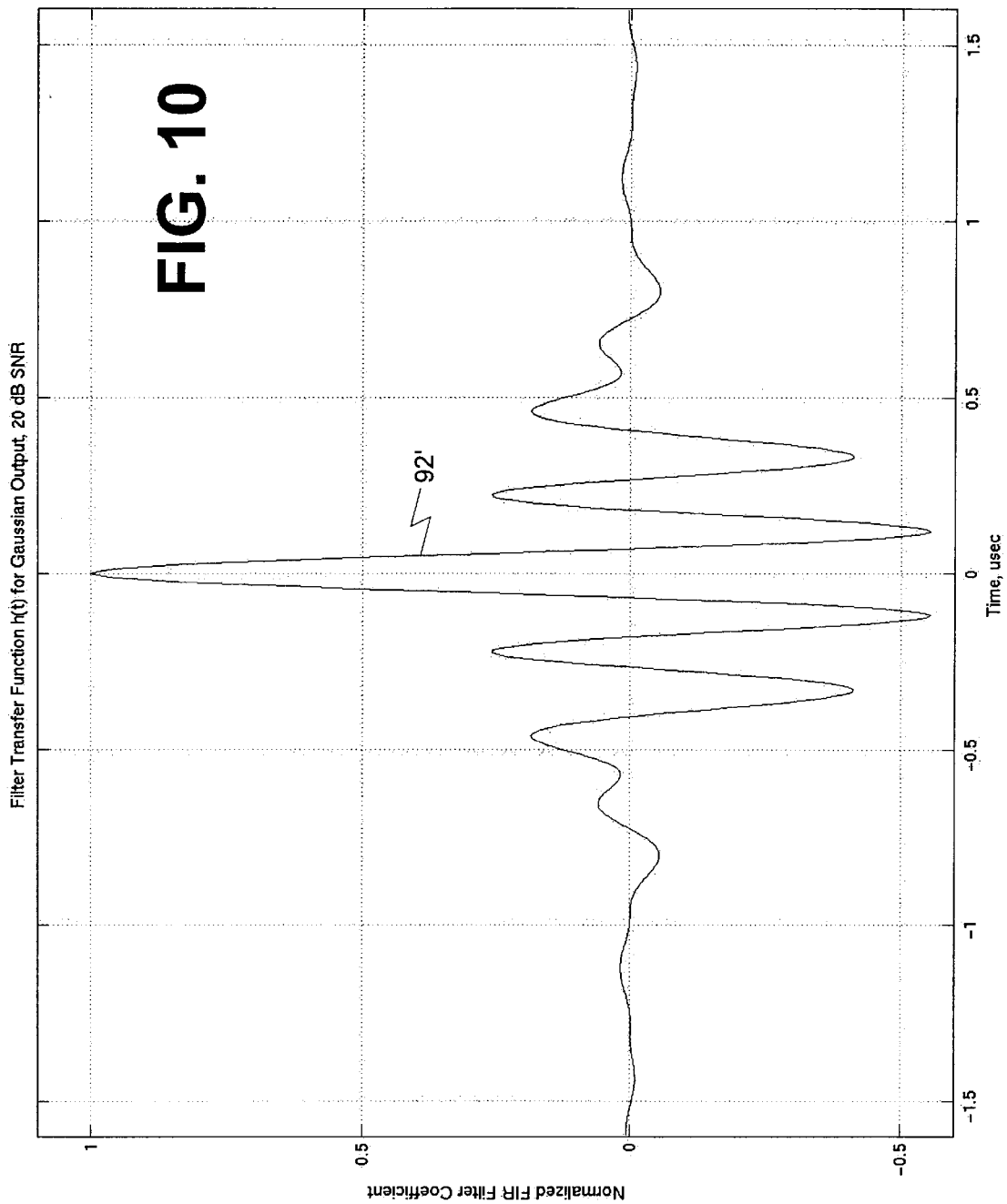

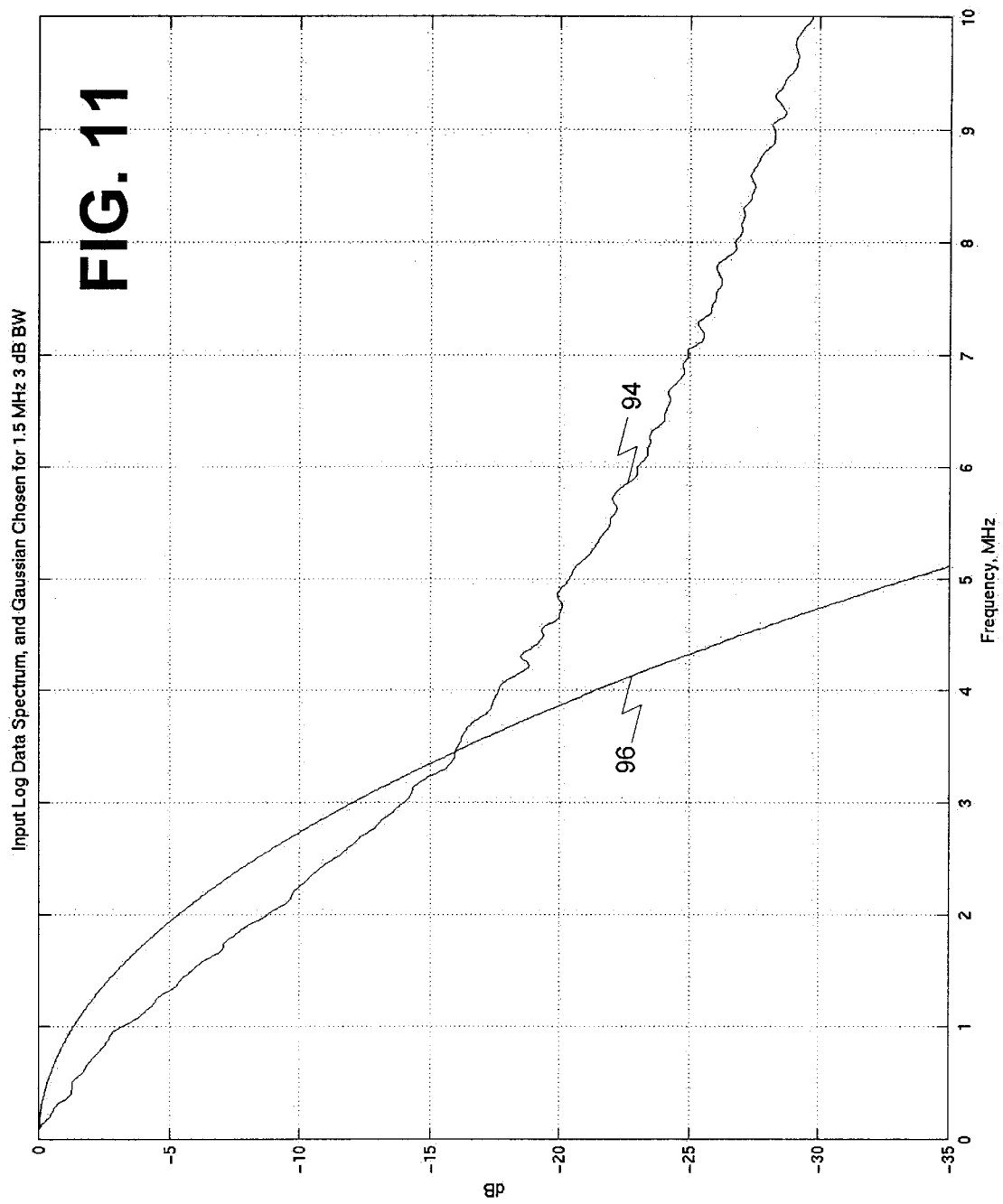

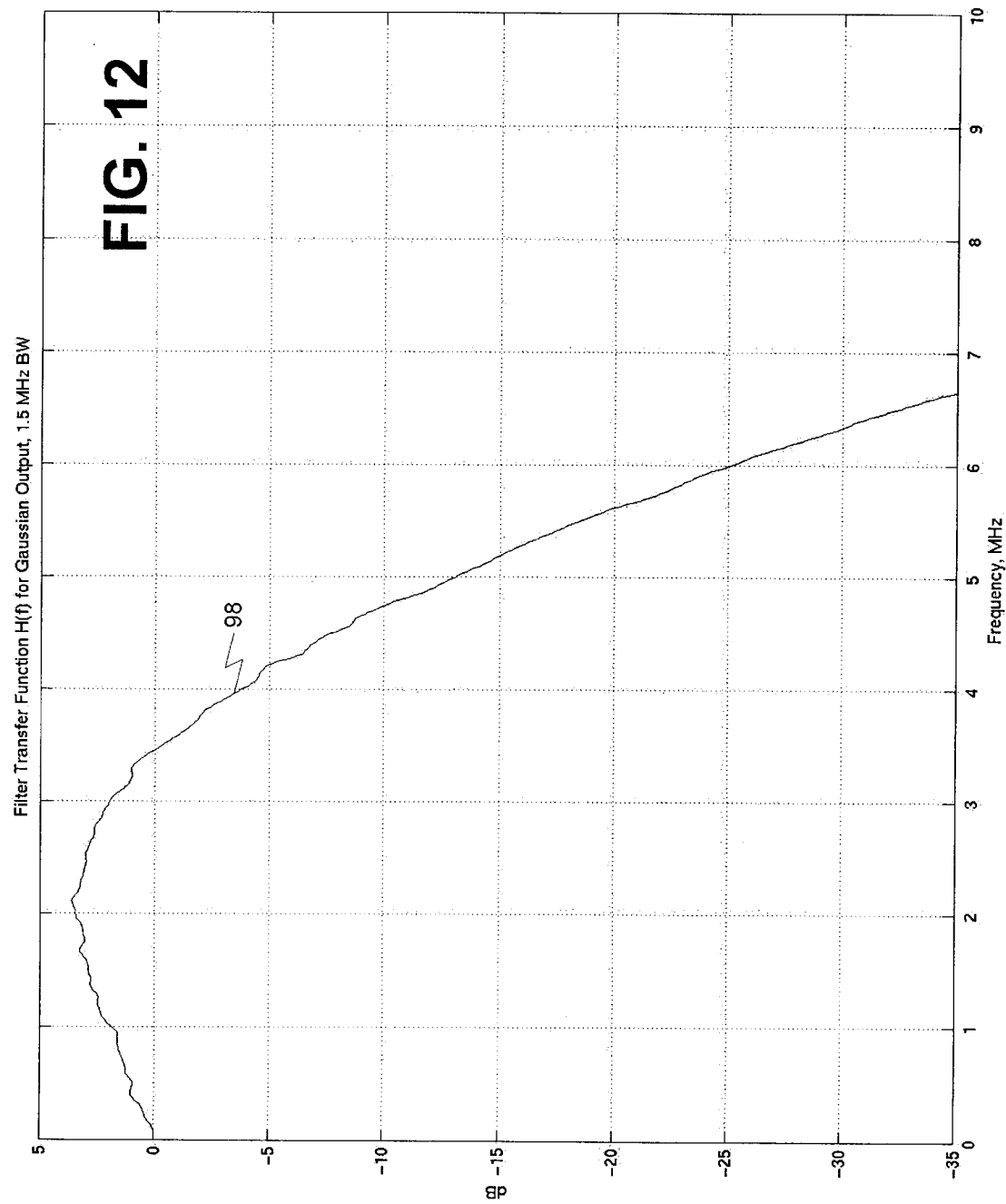

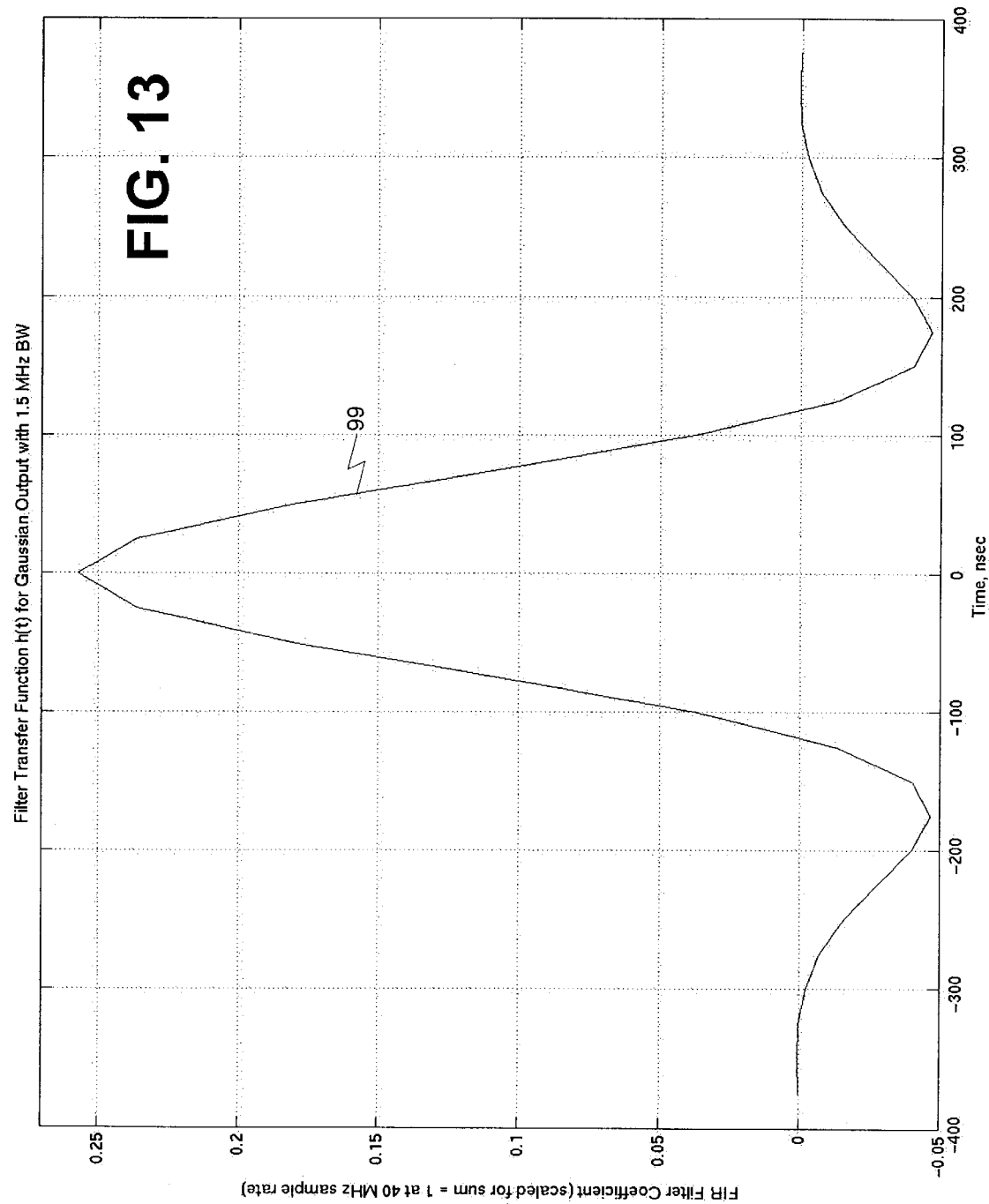

ULTRASOUND IMAGING SYSTEM AND METHOD EMPLOYING AN ADAPTIVE FILTER

FIELD OF THE INVENTION

The present invention is generally related to ultrasound imaging systems, and more particularly, to an ultrasound imaging system and method that employ an adaptive filter for optimally filtering ultrasound data in order to produce better ultrasound images for display.

BACKGROUND OF THE INVENTION

Modern high performance ultrasound imaging systems, such as the SONOS™ 5500 that is manufactured by and commercially available from the Hewlett-Packard Company, U.S.A., are utilized for medical applications, among others. The latest designs of these systems use a wide bandwidth transducer to emit and receive ultrasound signals from an object (e.g., a patient) under test as well as a wide bandwidth digital beamformer and one or more filters for processing the data encoded on the ultrasound signals received from the object under test.

For ultrasound imaging systems implementing B-mode (grayscale brightness) imaging, such systems are typically configured to transmit a single pulse, approximating an impulse, and to use digital filters in the receive path to tailor the trade-offs of sensitivity, spatial resolution, and contrast (average gray level) resolution. In this regard, oftentimes, a digital bandpass radio frequency (RF) filter is implemented after the beamformer, and a digital low-pass post-detection filter is implemented downstream from the RF filter, typically after an amplitude detector.

There are many factors to consider in the design and operation of the RF and the post-detection filters. In general, a wider and smoother RF spectrum makes the speckle spatially smaller, because the coherence length is reduced; however, the RF filter bandwidth does not directly affect the speckle variance. A wider RF bandwidth can improve spatial resolution. The spatially smaller speckle can be averaged with the post-detection filter to improve contrast resolution.

Since the transducer aperture is typically only 32 to 64 wavelengths at the center frequency (and effectively even smaller at longer wavelengths), increasing the RF bandwidth by including lower frequencies can significantly degrade the lateral spatial resolution, because the lower frequencies are more weakly focused. The transducer filters both the transmit and receive signals, and the body attenuation of the signal is approximately proportional to the frequency (dB/MHz/cm) of the signal. This means that higher frequencies (which make a sharper image) usually have a much poorer signal-to-noise (S/N) ratio, so therefore, increasing the RF bandwidth by including higher frequencies can significantly degrade the sensitivity. The frequency dependent attenuation makes it desirable to have filters which dynamically change with depth as the echo is being received, either to improve performance as much as possible at each depth, or to create a uniform speckle texture. Furthermore, the generation of second harmonic signals in the propagation of the transmit pulse offers many opportunities for improved imaging, but brings along a whole new set of filtering trade-offs. Finally, with digital filters, aliasing artifacts must be considered.

In general, as is clear from the foregoing, the receive filtering is far too complicated to expect a system operator to understand or optimize it. Hewlett-Packard's SONOS 5500 ultrasound imaging system dealt with this issue by providing the operator with a simplified choice of 5 predetermined filter settings, or recipes. Each recipe on each transducer type was painstakingly developed by the system designers by empirically adjusting more than a dozen parameters while imaging many patients. While the SONOS 5500 ultrasound imaging system offers much better images and more versatility than previous systems, it is not optimum for any particular patient, and the time and effort to develop recipes for new transducers is daunting.

Thus, there is a need in the industry for a better way to implement filtering in an ultrasound imaging system.

SUMMARY OF THE INVENTION

The present invention provides for an ultrasound imaging system and method having an adaptive filter within its image processing pipeline for transforming input data to produce output data having one or more desired signal statistics.

Architecturally, the ultrasound imaging system includes an adaptive filter in electrical communication with a controller, for example, a digital signal processor. Generally, an adaptive filter is a filter having a transfer function that can be adjusted, or changed, based upon sampled signal statistics, or signal features, associated with an input or output signal. In the preferred embodiment, this adjustment can be performed selectively, dynamically, and/or automatically. The adaptive filter itself includes a filter, for example, a digital filter or analog filter, but preferably a digital filter, configured to receive input signals and produce output signals. The adaptive filter exhibits a transfer function defined by one or more filter parameters (in the context of a digital filter, coefficients $C_i$). A controller is configured to generate the filter parameters based upon one or more signal constraints that are input by a user/operator/designer and based upon one or more sample signal statistics associated with one or more sample input or output signals. The adaptive filter communicates the filter parameters to the adaptive filter. The filter parameters cause the adaptive filter to transform input signals (e.g., an acoustic line of data), based upon the transfer function, to produce output signals exhibiting, at least approximately, the one or more desired signal statistics.

In accordance with another feature of the invention, several different filter parameter or coefficient sets may be utilized in the adaptive filter in connection with, for example but not limited to, different object parts (e.g., blood, tissue, etc.) to be imaged.

In accordance with another feature of the invention, the adaptive filter may be (a) operated by a designer so as to preset the coefficients, perhaps before distribution of the system, (b) occasionally initiated by a user/operator to reset the coefficients, or (c) automatically initiated by the system, perhaps periodically at regular or irregular time intervals or upon detection of a certain event, during operation of the system in order to reset the coefficients.

The present invention may also be broadly viewed as providing a method for ultrasound imaging. Briefly stated, the method comprises the following steps: receiving one or more signal constraints; analyzing a sample signal having one or more signal statistics; generating one or more filter parameters (e.g., coefficients) based upon the signal constraints and the signal statistics; communicating the filter coefficients to an adaptive filter (e.g., a digital filter); and modifying an input signal to the adaptive filter based upon the filter parameters to produce an output signal having at least an approximation of the one or more desired signal statistics.

The ultrasound imaging system employing the adaptive filter and method in accordance with the present invention has many advantages, a few of which are delineated hereinafter, as merely examples.

One advantage of the invention is that filtering is more optimal than prior art embodiments.

Another advantage of the invention is that it can be configured to automatically filter ultrasound data, thereby eliminating the need to manually adjust filter settings.

Another advantage of the invention is that it enables different filter configurations, each of which is optimized for a different system set up or situation, such as depth, body part type, or object (patient) characteristics.

Another advantage of the invention is that it eliminates subjective examination of final images (for filter specification) and parametric description of filters.

Other features and advantages of the invention will become apparent to one with skill in the art upon examination of the following drawings and detailed description. These additional features and advantages are intended to be included herein within the scope of the present invention.

BRIEF DESCRIPTION OF THE DRAWINGS

FIG. 1 is a block diagram of a first embodiment of an ultrasound imaging system that employs the adaptive filter of the present invention;

FIG. 2B is a block diagram of a second embodiment (feed-back configuration) of an adaptive filter in accordance with the present invention;

FIG. 6 is a graph (amplitude versus frequency) showing an average spectrum of input data in accordance with a first hypothetical example for enabling the adaptive filter of FIG. 2A or FIG. 2B to compute coefficients for its associated digital filter;

FIG. 7 is a graph (ratio of Gaussian standard deviation to signal bandwidth versus S/N ratio) showing a complementary error function for the first hypothetical example from which the standard deviation of a Gaussian function having a certain fraction of power in its side lobes (tails) is obtained;

FIG. 8 is a graph (amplitude versus frequency) showing a Gaussian data spectrum for the first hypothetical example derived from the input data spectrum of FIG. 6 and 20 dB signal-to-noise ratio;

FIG. 9 is a graph (amplitude versus frequency) showing a first transfer function computed from the Gaussian data spectrum of FIG. 8, the first transfer function for the adaptive filter of FIG. 2A or FIG. 2B in the first hypothetical example;

FIG. 10 is a graph (filter coefficients versus time) showing the time response for the adaptive filter of FIG. 2A or FIG. 2B in the first hypothetical example, from which filter coefficients are derived;

FIG. 11 is a graph (amplitude versus frequency) showing an average spectrum of input data that is used to derive a second transfer function for the adaptive filter of FIG. 2A or FIG. 2B in a second hypothetical example;

FIG. 12 is a graph (amplitude versus frequency) showing a second transfer function for the adaptive filter of FIG. 2A or FIG. 2B in the second hypothetical example; and FIG. 13 is a graph (filter coefficient versus time) showing the time response for the second transfer function of FIG. 12 in the second hypothetical example, from which filter coefficients are derived.

DETAILED DESCRIPTION OF THE PREFERRED EMBODIMENT

Figure 2A:
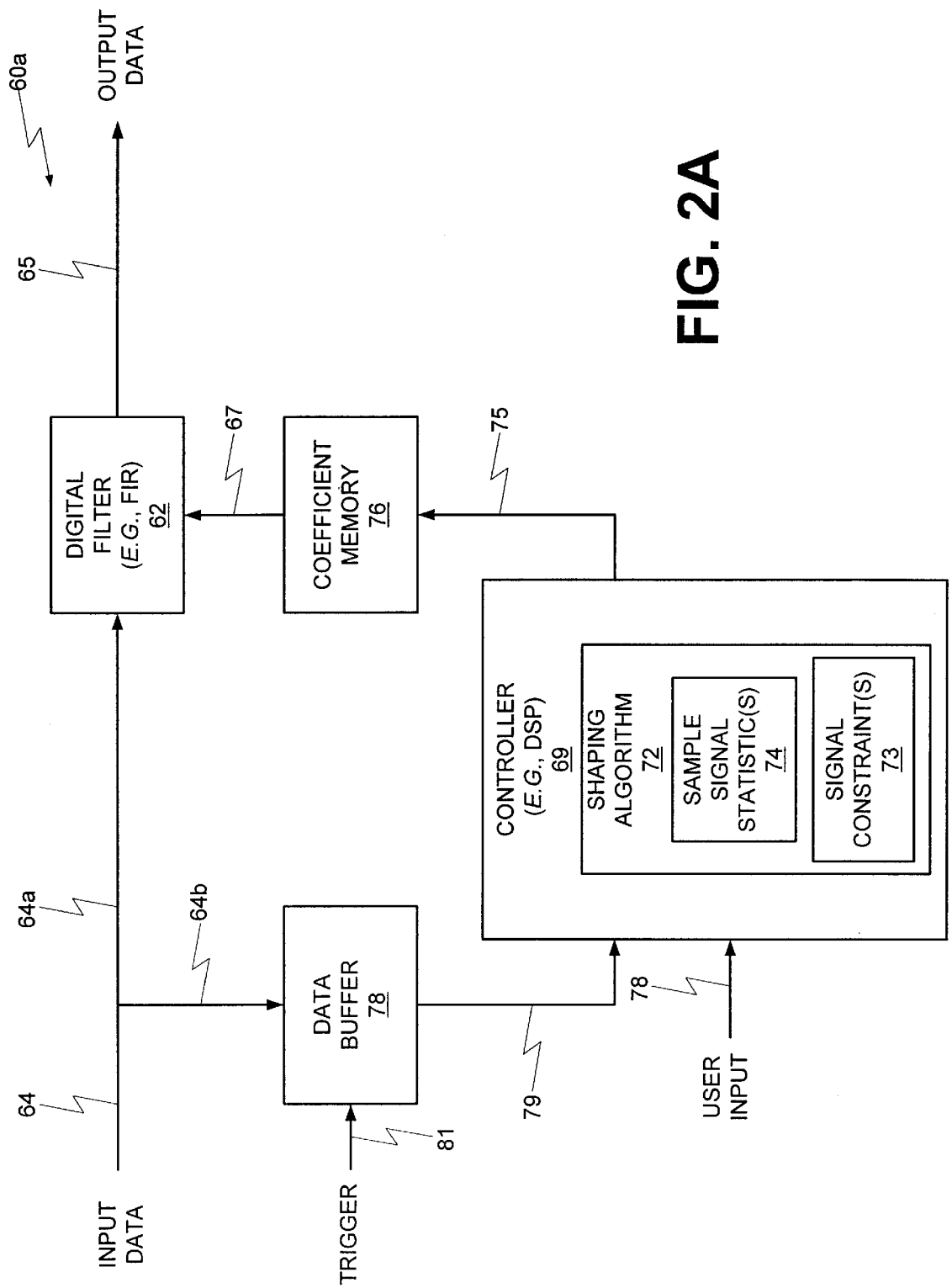
FIG. 2A is a block diagram of a first embodiment (feed-forward configuration) of an adaptive filter in accordance with the present invention.

The adaptive filter and method of the present invention will now be specifically described in detail in the context of an ultrasound imaging system that creates and displays brightness mode (B-Mode) images, or gray-scale images, which are well known in the art. However, it should be noted that the adaptive filter and method of the present invention may be incorporated in other ultrasound imaging systems, including but not limited to, color flow imaging systems and other ultrasound imaging systems that are suited for the adaptive filter and method, as will be apparent to those skilled in the art.

I. System Architecture

Generally, the architecture of three different embodiments (merely specific examples) of a B-mode ultrasound imaging system is described in detail hereafter. However, it should be clear to one with skill in the art that the adaptive filter of the invention can be implemented at virtually any data processing stage within the processing pipeline associated with an ultrasound imaging system.

A. First Embodiment of Ultrasound Imaging System

The architecture of a first embodiment of the ultrasound imaging system of the present invention is illustrated by way of a functional block diagram in FIG. 1 and is generally denoted by reference numeral 10. Note that each block of FIG. 1 (as well as FIGS. 2 through 4) defines a logical function that can be implemented in hardware, software, or a combination thereof. For purposes of achieving high speed, it is preferred, at present, that most of the blocks be implemented in hardware, unless specifically noted hereafter.

In general, the first embodiment of the ultrasound imaging system 10 exhibits architecture similar to that of a conventional ultrasound imaging system, except that an adaptive filter of the present invention is implemented in place of the RF filter that is typically situated in the signal processing pipeline. Referring to FIG. 1, the ultrasound imaging system 10 includes a central processing unit (CPU) 11 designed to control the operation and timing of the various elements and data flow of the system 10 pursuant to suitable software.

The ultrasound imaging system 10 further includes an ultrasonic transducer 13 configured to emit and receive ultrasound signals, or acoustic energy, respectively to and from an object under test (e.g., a body or a patient when the ultrasound imaging system 10 is used in the context of a medical application). Many types of transducers 13 are known in the art and are suited for use in connection with the present invention.

In the preferred embodiment, the transducer 13 comprises an array of elements typically made of a piezoelectric material, for example but not limited to, crystal. Each element is voltage biased and supplied with an electrical pulse or other suitable electrical waveform, causing the elements to collectively propagate an ultrasound pressure wave into the object under test. Moreover, in response thereto, one or more echoes are emitted by the object under test and are received by the transducer 13, which transforms the echoes into an electrical signal for further processing.

The array of elements associated with the transducer 13 enable a beam, emanating from the transducer array, to be steered (during transmit and receive modes) through the object by shifting the phase (introducing a time delay) of the electrical pulses/biasing signals supplied to the separate elements. During transmit, an analog waveform is communicated to each transducer element, thereby causing a pulse to be selectively propagated in a particular direction, like a beam, through the object.

During the receive mode, an analog waveform is received at each transducer element at each beam position. Each analog waveform essentially represents a succession of echoes received by the transducer element over a period of time as echoes are received along the single beam through the object. The entire set of analog waveforms represents an acoustic line, and the entire set of acoustic lines represents a single view, or image, of an object and is referred to as a frame.

A transmit pulser 15 is electrically connected to the transducer and generates electrical pulses 16 that are periodically communicated to the array of elements of the transducer 13, causing the transducer elements to emit ultrasound signals into the object under test of the nature described previously. The transmit pulser 15 typically provides separation between the pulse transmissions to enable the transducer 13 to receive echoes from the object during the period therebetween and forwards them onto a set of parallel analog preamplifiers 18.

The plurality of preamplifiers 18 receives analog electrical echo waveforms 17 from the transducer 13 that are generated by echoes emitted from the object under test. More specifically, each preamplifier 18 receives an analog electrical echo waveform from a corresponding transducer element for each acoustic line. Moreover, the set of preamplifiers 18 receives a series of waveform sets, one set for each separate acoustic line, in succession over time and processes the waveforms in a pipeline processing manner. The set of preamplifiers 18 is configured to amplify the echo waveforms 17 to provide amplified echo waveforms 19 in order to enable further signal processing, as described hereafter. Because the ultrasound signals received by the transducer 13 are of low power, the set of preamplifiers 18 should be of sufficient quality that excessive noise is not generated in the process.

Because the echo waveforms typically decay in amplitude as they are received from progressively deeper depths in the object under test, the plurality of analog preamplifiers 18 in the system 10a are connected respectively to a parallel plurality of time-gain compensators (TGCs) 21, which are known in the art and which are designed to progressively increase the gain during each acoustic line, thereby reducing the dynamic range requirements on subsequent processing stages. Moreover, the set of TGCs 21 receives a series of waveform sets, one set for each separate acoustic line, in succession over time and processes the waveforms in a pipeline processing manner.

A plurality of parallel analog-to-digital converters (ADC) 22 is connected respectively to the plurality of TGCs 21, as shown in FIG. 1. Each of the ADCs 22 is configured to convert its respective analog echo waveform 14 into a digital echo waveform 23 comprising a number of discrete location points (hundreds to thousands; corresponds with depth and may be a function of ultrasound transmit frequency) with respective quantized instantaneous signal levels, as is well known in the art. In previous prior art ultrasound imaging systems, this conversion often occurred later in the signal processing steps, but now, many of the logical functions that are performed on the ultrasonic signals can be digital, and hence, the conversion is preferred at an early stage in the signal processing process. Similar to the TGCs 21, the plurality of ADCs 22 receive a series of waveforms for separate acoustic lines in succession over time and processes the data in a pipeline processing manner. As an example, the system may process signals at a clock rate of 40 MH with a B-mode frame rate of 100 Hz.

A beamformer 24 is connected to the ADCs 22 and is designed to receive the multiple digital echo waveforms 23 (corresponding with each transducer element) from the ADCs 22 and combine them to form a single acoustic line 26. To accomplish this task, the beamformer 24 delays the separate echo waveforms 23 by different amounts of time and then adds the delayed waveforms together, in order to create a composite digital RF acoustic line 26. The foregoing delay and sum beamforming process is well known in the art. Furthermore, the beamformer 24 receives a series of data collections for separate acoustic lines in succession over time and processes the data in a pipeline processing manner.

An adaptive filter 60 (60a or 60b of FIGS. 2A and 2B, respectively) of the present invention is connected to the beamformer 24 and is configured to receive and process digital acoustic lines in succession. The adaptive filter 60 is configured to receive each digital acoustic line 26, to modify it, and to produce a digital acoustic line 28 that exhibits one or more desired signal statistics. Generally, the adaptive filter 60 exhibits a transfer function H(Ci, t), which is defined by one or more filter coefficients $C_i(t)$, where i=1, 2, . . . and where t is time, and which is capable of being adjusted based upon statistics associated with an input or output signal. The set of filter coefficients $C_i(t)$ are generated based upon (a) one or more signal constraints that are input by a user/operator or designer and (b) one or more sample signal statistics derived from a sample signal, which is essentially one or more acoustic lines of input data or output data. First and second embodiments (nonlimiting examples; feed-forward and feed-back configurations, respectively) of the adaptive filter will be described in detail later in this document with reference to FIGS. 2A and 2B.

Referring again to FIG. 1, a mixer 29 is connected to the adaptive filter 60, as illustrated, and is designed to process each digital acoustic line in pipeline manner. The mixer 29 is configured to combine the filtered digital acoustic line 28 from the adaptive filter 60 with a local oscillator signal (not shown for simplicity) in order to ultimately produce a baseband digital acoustic line 32. Preferably, the local oscillator signal is a complex signal, having an in-phase signal (real) and a quadrature phase signal (imaginary) that are ninety degrees out of phase. The result of the operation produces sum and difference frequency signals. The sum frequency signal is filtered out, leaving the difference frequency signal, which is a complex signal at near zero frequency (near DC). A complex signal is desired in order to follow direction of movement of parts imaged in the object under test, and to allow accurate, wide bandwidth amplitude detection.

Up to this point in the receive processing, all operations can be considered substantially linear, so that the order of operations may be rearranged while maintaining substantially equivalent function. For example, in some systems it may be desirable to mix to a lower intermediate frequency (IF) or to baseband before beamforming or filtering. Such rearrangements of substantially linear processing functions are considered to be within the scope of this invention.

An amplitude detector 34 receives and processes, in pipeline manner, the complex baseband digital acoustic lines 32 from the mixer 29. For each, the amplitude detector 34 analyzes the envelope of the baseband digital acoustic line 32 to determine the magnitude of signal intensity at each point along the acoustic line and produces an amplitude-detected digital acoustic line 34. Mathematically, this means that the amplitude detector 34 determines the magnitude of each phasor (distance to origin) corresponding with each point along the acoustic line 32.

A log mechanism 38 receives the amplitude-detected digital acoustic lines 36, in pipeline processing manner, from the amplitude detector 34 and compresses the dynamic range of the data by computing the mathematical logarithm (log) of each line 36 to produce a compressed digital acoustic line 39 for further processing. Implementation of the log function enables a more realistic view, ultimately on the display, of the change in brightness corresponding to the ratio of echo intensities.

A post-log filter 41, usually a low-pass filter, is connected to the log mechanism 38 and is configured to receive the compressed digital acoustic lines 39 in pipeline fashion and to filter the high frequencies associated with the compressed digital acoustic lines 39. The primary purpose for the low-pass post-log filter 41 is to enhance the quality of the ultimate display image. Generally, the low-pass post-log filter 41 softens the speckle in the displayed image. The low-pass post-log filter 41 can also be configured to perform anti-aliasing. The low-pass filter 41 can be designed to essentially trade spatial resolution for gray-scale resolution.

An acoustic memory 45, preferably a suitable species of random access memory (RAM), receives the filtered digital acoustic lines 43 from the low-pass post-log filter 41. The acoustic memory 45 is configured to accumulate acoustic lines of data over time. The acoustic lines 43 can be defined within a two (2D) or three (3D) dimensional space, typically a 2D or 3D polar coordinate system, respectively.

A scan converter 48 is connected to the acoustic memory 45 and is designed to convert the data 46 from the acoustic memory 45 from one coordinate system to another in order to produce pixels for display. The scan converter 48 processes the data in the acoustic memory 45 once an entire data frame (set of all acoustic lines in a single view, or image/picture to be displayed) has been accumulated by the acoustic memory 45. If two-dimensional (2D) data, then the acoustic memory 45 receives and stores 2D data, typically in defined in polar coordinates, and the scan converter 48 converts the 2D polar coordinate data into 2D rectangular (orthogonal) data capable of raster scan on a raster scan display. If three-dimensional (3D), then the scan conversion is more complicated. In this case, the acoustic memory 45 receives and stores 3D data, and the scan converter 48 renders and scan converts it, i.e., converts it into a 2D view from an appropriate vantage point that is capable of being raster scanned by a display. The scan converter 48 outputs picture elements (pixels) 51 for storage and/or display.

A video memory 52, also referred to conventionally as a frame buffer, stores the pixel data 51 from the scan converter 48. The video memory 52, typically a species of RAM, makes the data readily available to a display 54 for viewing by a user/operator.

A conventional display device 54 is in electrical communication with the video memory and is configured to periodically retrieve the pixel data 51 from the video memory 52 and drive a suitable screen for viewing of the ultrasound image by a user/operator.

1. First Embodiment of Adaptive Filter

With reference to FIG. 2, a first embodiment of the adaptive filter 60 of the present invention is illustrated by way of a functional block diagram and is generally denoted by reference numeral 60a. In architecture, the adaptive filter 60a of the first embodiment includes a conventional digital filter 62, preferably but not limited to, a conventional finite impulse response (FIR) filter, which is well known in design. Generally, the digital filter 62 imposes a definable (adjustable) transfer function H(t) upon digital input data 64 in order to produce digital output data 65 that is a modified version of the digital input data 64. In order to adjust the transfer function H(t) of the digital filter 62, filter coefficients $C_i$, where i=1, 2, . . . , denoted by reference numeral 67, are produced and communicated to the digital filter 62.

The filter coefficients 67 are controlled, produced, and communicated by a suitable controller 69, which can be implemented in hardware, software, or a combination thereof. Preferably, the controller 69 is implemented with a conventional digital signal processor (DSP), operating pursuant to a shaping algorithm 72, which in this embodiment is implemented in software that is stored in a suitable memory (not shown) and communicated to the DSP controller 69. The shaping algorithm 72 is forwarded one or more signal constraints 73 by a user/operator or designer via a suitable control input 78 and sample input data 64, 64b in order to apprise the shaping algorithm 72 of the desired signal statistics to be achieved in the output data 65.

The speed of the controller 69 can be much slower than the rate at which input data 64 is processed by the digital filter 62 or the rate at which images are processed by the ultrasound imaging system 10a. For example, the ultrasound imaging system 10a (FIG. 1) may process data at a clock rate of 40 MHz with a B-mode frame rate of 100 Hz, but the controller 69 only needs to update the adaptive filter coefficients 75 about once per second in order to keep up with the changing anatomical views during a clinical examination. So, even calculations involving averaging many Fast Fourier Transforms (FFTs) are well within the capabilities presently available in a low cost DSP controller 69.

A data buffer 78 (e.g., RAM) is provided for receiving input data 64b and is utilized in this particular design because the DSP controller 69 is generally too slow to read all of the input data 64, 64b at full speed. The data buffer 78 acquires one or more entire acoustic lines of data, which the DSP 69 can then read and process at its own speed, while other nonretrieved lines of data continue to flow through the digital filter 62. A trigger 81 enables/disables the data buffer 78 at appropriate times to ensure that the data buffer 78 fills with an entire acoustic line at a time (or other specified subset of the data) so that sample statistics are representative of the image area of interest. The trigger 81 is generated by any suitable timing element, but in this embodiment, is produced by the CPU 11 (FIG. 1).

Note that the data buffer 78 is an optional element. It is possible that a controller 69 having a suitable internal data buffer could be utilized. Moreover, the data buffer 78 may not be needed if the controller 69 is fast enough to read all of the acoustic lines of input data 64, 64a at full speed.

The software-based shaping algorithm 72 controls the DSP controller 69 in such a way to ensure that enough input data 64 is acquired so that the sample signal statistics that are calculated are sufficiently precise and representative. The shaping algorithm 72 is designed to analyze one or more sample acoustic lines from the data buffer 78, to compute sample signal statistics associated with the input data 64, such as spectrum and signal-to-noise (S/N) ratio, and compute filter coefficients (the sets may be symmetric or asymmetric) that will optimally transform similar subsequent input data to exhibit (at least approximately) the desired one or more signal statistics, subject to the signal constraints provided by the user/operator/designer.

In general, the one or more signal constraints that may be input by the user/operator/designer may include, for example but not limited to, any of the following:

(a) a deviation from a desired spectral shape (such as a mathematical function, for instance, a Gaussian curve with a certain center frequency and bandwidth;

(b) a bandwidth;

(c) a width or level of sidelobes of an autocorrelation, or the mathematical equivalent in the Fourier domain;

(d) a variance, or standard deviation, (resulting from speckle) in a region of substantially uniform signal magnitude;

(e) a signal-to-noise (S/N) ratio;

(f) a fraction of signal power below or above a specified frequency threshold;

(g) a mean frequency of the product of a weighting function multiplied times a spectrum (the weighting function could be, for example, 1/f or a constant);

(h) a proportion of second harmonic power; and/or when ultrasound contrast agents are used in connection with the ultrasound imaging system 10, the transmit power, focal strength, and/or pulse repetition interval to maximize the contrast effect;

(i) if several different pre-detection adaptive filters 60 (FIG. 1) are used for frequency compounding, the gain or frequency response of the filters 60 to make their output powers approximately equal and their output cross-correlations (or frequency response overlap) minimal, in order to minimize speckle variance, subject to some constraints, such as signal-to-noise ratio or resolution;

(j) if several different transmit and/or receive apertures are used in the transducer 13 for spatial compounding, the size, offset, and/or apodization of the apertures in order to minimize the cross-correlation, which minimizes the speckle variance, subject to some constraints such as signal-to-noise ratio or resolution;

(k) a requirement to maximize or minimize one or more statistics;

(l) a requirement to maximize or minimize one or more statistics, while constraining one or more other statistics to not exceed a particular value, or threshold;

(m) a requirement to maximize or minimize a weighted combination of statistics;

(n) a requirement to repeatedly analyze sample sets of input or output data, such that the coefficients adapt to changes in the input or output data, respectively;

(o) a requirement to perform the coefficient calculation once for a certain class of system setups using a sample set of input data, with the coefficients thereafter remaining fixed for that class of system setups regardless of subsequent changes of input data;

(p) a requirement to automatically respond to changes in system settings, such as transducer type, depth range, or examination type, by detecting a change and by generating a new set of coefficients for a new system setting;

(q) a requirement to analyze signal statistics from different depth regions (that change with time as echoes are received from different depths) and to generate and use different coefficients for different depth regions;

(r) a requirement to analyze signal statistics from different lateral regions (that change for different lateral regions (that is, different acoustic lines) and to generate and use different coefficients for different lateral regions; and/or (s) a requirement to perform separate calculations for spatial regions of data that are above and below an amplitude threshold (e.g., approximating a tissue versus blood or cyst segmentation); the threshold may be maintained constant or may be changed dynamically; the threshold may track gradual large-scale variations in the input or output signal level or gain.

In some instances, the shaping algorithm 72 can be configured to control the controller 69 to calculate the filter coefficients by first analyzing a noise signal, then analyzing a subsequent sample signal having the one or more sample signal statistics, and finally computing the coefficients based upon the foregoing first and second analyses. This procedure can enable the shaping algorithm 72 to better isolate and analyze the signal characteristics associated with the second signal, and thereby produces more accurate coefficients.

To better understand the adaptive filter 60 and the shaping algorithm 72, a couple of specific examples of filter calculations are set forth in detail hereinafter and described relative to FIGS. 6 through 13.

Furthermore, note that the software-based shaping algorithm 72, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

With reference again to FIG. 2A, in this embodiment, a coefficient memory 76 is connected to the controller 69 for receiving and storing the filter coefficients $C_i$. The coefficient memory 76 is an optional element and may be eliminated in some alternative embodiments. The memory 76 is useful in those implementations where different sets of coefficients are desired. Different coefficients could be desired during different imaging scenarios. For example, the filter coefficients $C_i$ may be varied along the depth of an acoustic line or with the lateral position of the acoustic line in its frame.

Note that, although not preferred at present, all embodiments of the adaptive filter 60 described herein could be implemented using a conventional analog filter instead of a digital filter. In a configuration employing an analog filter, parameters, similar to coefficients in the context of digital filters, are manipulated to change the transfer function of the analog filter.

a. Multiple Coefficient Sets

A plurality of different coefficient sets, one for each type of body part (e.g., blood, tissue, etc.) to be imaged, may be desired and implemented by the adaptive filter 60 associated with an ultrasound imaging system 10. For example, consider the following. If the same filter coefficients are used in regions of the image where the signal is very weak, such as in a blood region or a cyst region, then the output data 65 will be mainly filtered noise. The filtered noise will have the same spectral shape as the filter frequency response, or filter transfer function, which is generally a wider bandwidth than the spectrum of the filtered signal. So regions of the image where noise predominates will have a finer texture, and also more changes from frame to frame, which provides opportunities for more filtering downstream to improve perceived signal-to-noise ratio. Also, since the bandwidth of the RF signal which is above the noise level becomes narrower as the signal becomes weaker, it could be advantageous to have multiple sets of filter coefficients, such that the filter bandwidth depends on signal-to-noise ratio at any particular area in the image (not just dependent on the average degradation of signal-to-noise ratio with increasing depth).

The shaping algorithm 72 can be designed to switch from one set of coefficients to another by analyzing a sample signal for predefined changes. For example, if the input data power level gets weak, i.e., below a predefined threshold, then the shaping algorithm 72 can be configured to switch to a new set. As another example, if the average signal magnitude over a certain region is less than or greater than a predefined threshold, then the shaping algorithm 72 may be designed to switch to a new set of coefficients. Moreover, then, the shaping algorithm 72 can further adapt the coefficients thereafter based upon the sampled signals.

As another example when a plurality of coefficient sets may be desired, consider the following. The signal statistics tend to be the worst at the deepest regions in the image. In other words, with a signal-to-noise ratio constraint, the output Gaussian bandwidth will be narrowest for the deepest regions, giving a relatively blobby speckle pattern. Users do not necessarily want the system response to be optimized at the shallower regions of the image, where the signal strength would permit a wider bandwidth. They may prefer a speckle size which is approximately uniform over the whole image. If this is the case, then other output statistics can be improved at shallower depths. For example, in progressing from the deepest region to shallower regions, the output bandwidth could be increased by up to, for example 20%, then the output signal-to-noise ratio could be improved by up to about 6 dB, then the output center frequency could be increased above the center of the input signal frequency range to sharpen the lateral focus. Alternatively, if the post-log filter is also controlled by the DSP controller 69, then the speckle size could be kept constant over the image while the speckle amplitude is reduced at shallower depths.

b. Possible Configuration/Operation Modes

The controller 69 as well as the shaping algorithm 72 of the adaptive filter 60 can be designed to operate and function in one or more of several different modes, separately or concurrently, as discussed immediately hereafter.

In a first mode, the controller 69 and the shaping algorithm 72 are configured to permit a designer to provoke operation of the shaping algorithm 72 to generate a set of coefficients $C_i$ by communicating sample input data 64 and one or more signal constraints 73 to the shaping algorithm 72. In this mode, the coefficients $C_i$ are preset for a user/operator of the system 10a.

In a second mode, the shaping algorithm 72 is provoked by a user/operator to operate and recompute a new set of coefficients $C_i$. This can be accomplished, for example, via a hardware control connected to the controller 69 an/or CPU 11 (FIG. 1) or via a suitable software user interface associated with the controller 69 and/or CPU 11. In this mode, the coefficients $C_i$ can be changed occasionally by the user/operator of the system. Optimizing the filter coefficients can easily be accomplished by the controller 69 while the system 10a is imaging an object, so the adaptive filter 60 can automatically adapt to changes in the object, view, or system (such as depth range). When initiated, the shaping algorithm 72 will modify the coefficients based upon a new sample statistic(s) associated with a newly retrieved sample signal and the existing signal constraints 73. Additionally, the system user/operator can be provided with a control which directly varies one or more of the signal constraints 73 on the adaptive filter 60, for instance, the output signal-to-noise ratio or any of the other parameters previously mentioned.

In a third mode, the shaping algorithm 72 is configured to occasionally (periodically at regular or irregular time intervals or upon detection of an event) operate automatically during operation of its associated ultrasound imaging system 10 (10a, 10b, or 10c). When initiated, the shaping algorithm 72 will modify the coefficients based upon a new sample statistic(s) associated with a newly retrieved sample signal and the signal constraints 73. Initiation of the shaping algorithm 72 can be provoked by a simple triggering mechanism (not shown) comprised of logic implemented in software, hardware, or a combination thereof, but preferably software that is associated with the shaping algorithm 72 and executed by the controller 69. For example, the triggering mechanism can be designed to initiate the shaping algorithm 72 at certain predefined time intervals. As another example, the triggering mechanism may initiate the shaping algorithm 72 based upon a sensed operating parameter, such as an input data power level. More specifically, if the input data power level gets weak, i.e., below a predefined threshold, then the shaping algorithm 72 can be configured to adjust the bandwidth of a constraining function (e.g., a Gaussian equation) upon which the coefficients are based.

c. Multiple Independent Data Streams

The adaptive filter 60 can be employed and utilized in connection with a parallel beamformed system 10, wherein a plurality of acoustic beams and lines are processed in parallel throughout the signal processing pipeline associated with the ultrasound imaging system 10. A parallel beamformed system 10 provides better line density and/or a better frame rate, at the expense of complexity and cost.

In this configuration, the adaptive filter 60 is configured to receive multiple independent input data streams, to modify the inputs independently based upon one or more (in many implementations, the same) transfer functions, and to produce multiple independent output data streams. The controller 69 provides the adaptive filter 60 with the one or more sets of coefficients.

2. Second Embodiment of Adaptive Filter

The specific implementation of the adaptive filter 60a as shown in FIG. 2A exhibits a feed-forward configuration. An alternative implementation is a feed-back configuration, as illustrated in FIG. 2B, where the controller 69 acquires output data 65a, 65b, rather than the input data 64, and adjusts the filter coefficients 75 to attempt to impose the one or more desired output statistics 74 on the output data 65. Note that, throughout the views in the figures, like reference numerals designate corresponding parts. Hence, the discussion previously regarding elements having like reference numerals is incorporated herein by reference and is applicable to this second embodiment. Either of the feed-forward or feed-back configurations will work, but the feed-forward configuration may be preferred and is currently the best mode contemplated by the inventor, because it is believed to be inherently more stable.

B. Second Embodiment of Ultrasound Imaging System

Figure 3:
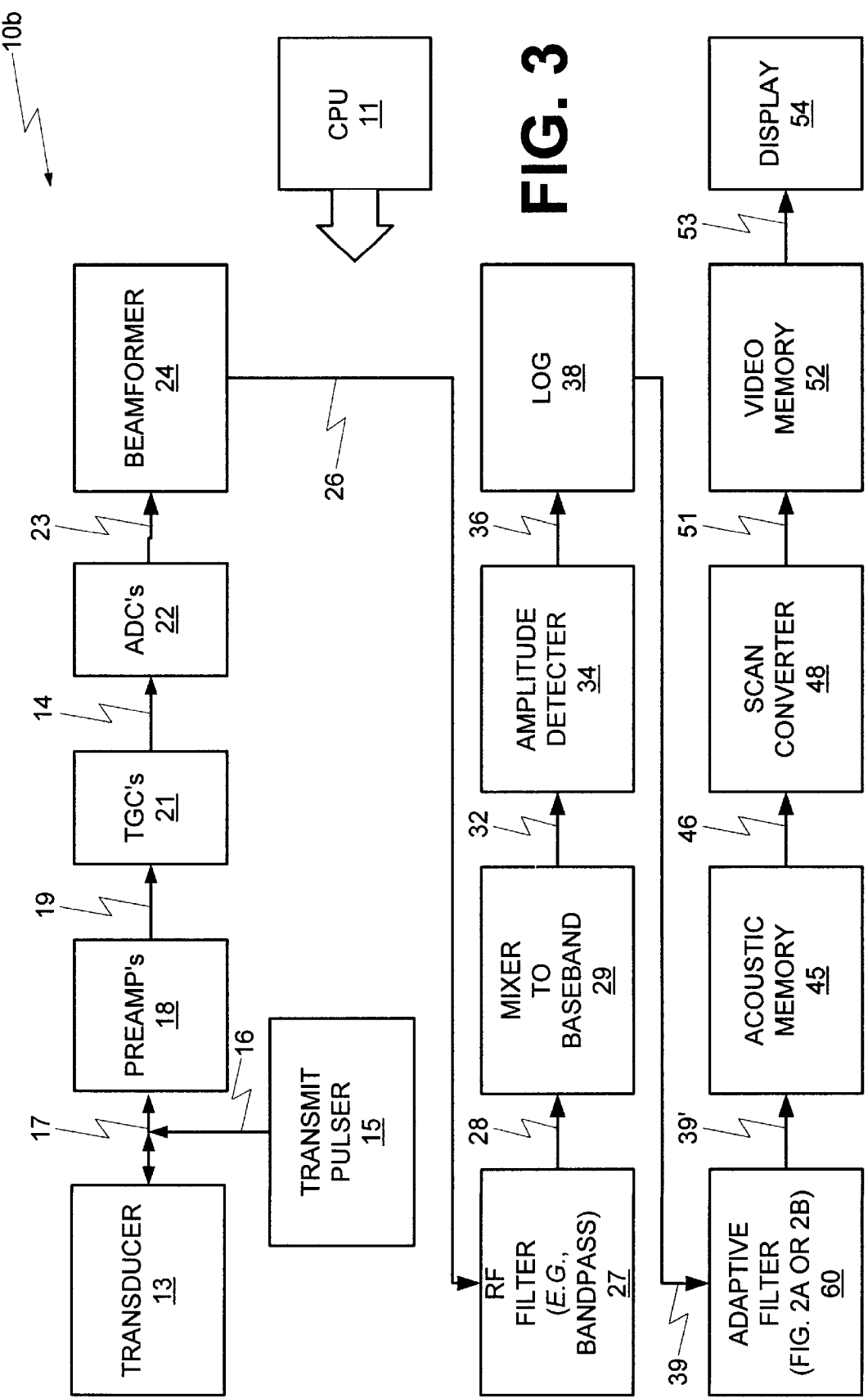
FIG. 3 is a block diagram of a second embodiment of an ultrasound imaging system that employs the adaptive filter of FIG. 2A or FIG. 2B.

A second embodiment of an ultrasound imaging system that employs the adaptive filter 60 (60*a* or 60*b* in FIGS. 2A and 2B, respectively) of the present invention is shown in FIG. 3 and generally denoted by reference numeral 10*b*. In this embodiment, the adaptive filter 60 of the present invention is implemented in place of the low-pass post-log filter that is typically implemented in conventional ultrasound imaging systems. The discussion previously regarding elements having like reference numerals is incorporated herein by reference and is applicable to this second embodiment.

In this second embodiment, just as in the first embodiment, an adaptive filter 60 (60*a* or 60*b*) or a conventional RF filter 27 (as shown in FIG. 3) is incorporated after the beamformer 24, particularly, between the beamformer 24 and the mixer 29. Moreover, in the second embodiment, unlike in the first embodiment of the system, the adaptive filter 60 is connected to receive the acoustic lines 26 from the log mechanism 38, and the adaptive filter 60 adapts the lines 26 to more desirable lines 28 for input to the acoustic memory 45, pursuant to the shaping algorithm 72 (FIGS. 2A and 2B).

Several aspects of the ultrasound imaging system 10*b* are worth noting. In this second embodiment, the shaping algorithm 72 of the adaptive filter 60 could be easily configured to affect the receive gain of the ultrasound imaging system 10*b* as a function of depth to create an automatic time-gain control (TGC; currently set manually with 8 slide controls in some prior art embodiments) or as a function of lateral position to create an automatic lateral gain control (LGC). For example, if the TGC that is applied before the adaptive filter 60*a* is initially set to a predetermined default function which approximately compensates the expected echo attenuation with depth, then the mean log-detected data 39 within a certain amplitude range would indicate the average tissue brightness as a function of depth, while excluding blood pools, cysts, or specular echoes. A heavily smoothed, inverted version of this curve added to the log-detected data 39 completes the adaptive TGC function.

Furthermore, the shaping algorithm 72 associated with the adaptive filter 60 could histogram the log-detected data to adaptively set the full-black and full-white levels for optimal gray-scale compression (and, potentially, further details of the gray-scale mapping function if it is not linear). Note that this is not necessarily the same as traditional histogram equalization (such as applied in X-ray medical imaging), which chooses a mapping function to flatten the brightness histogram to enhance subtle gray-level variations.

C. Third Embodiment Of Ultrasound Imaging System

Figure 4:
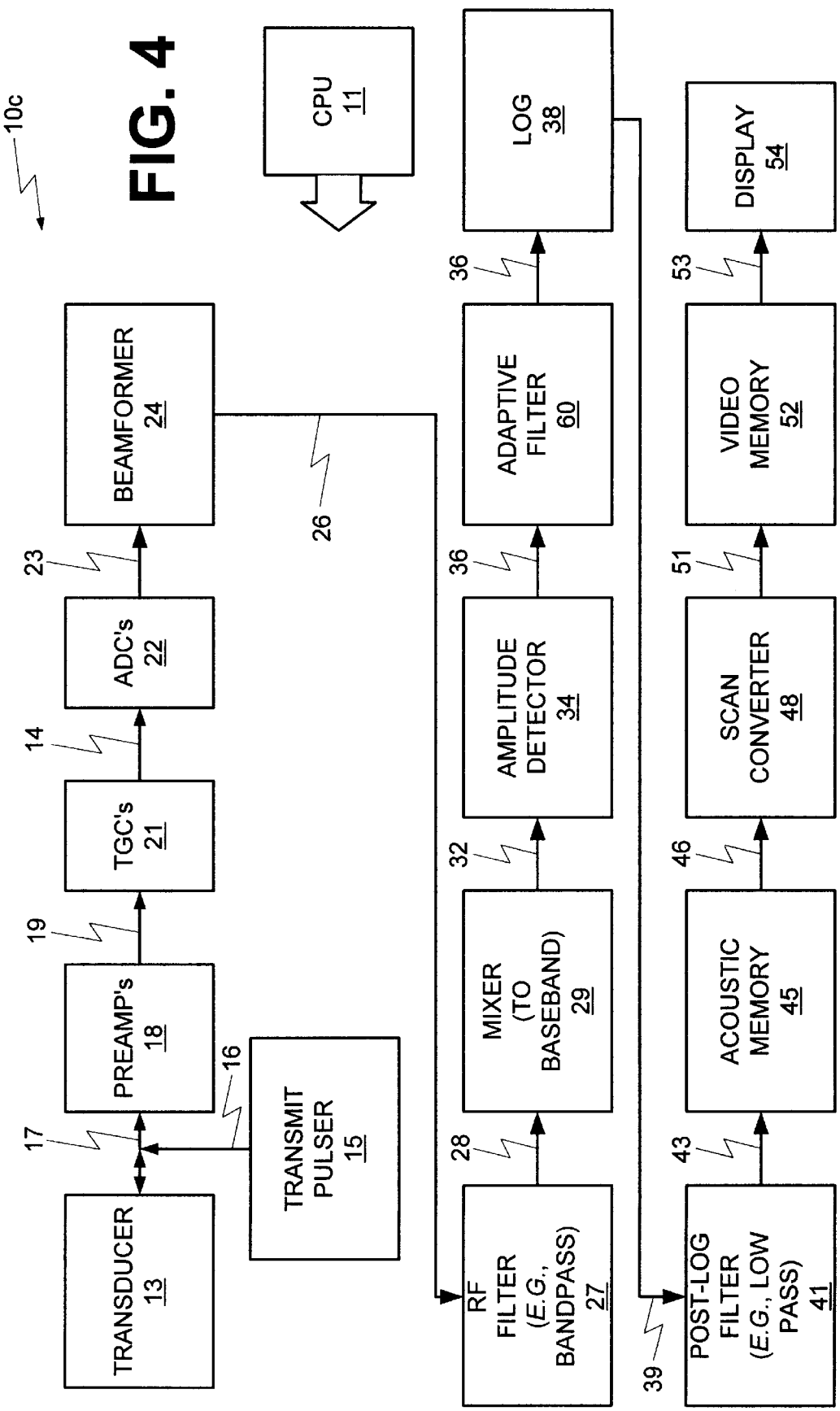
FIG. 4 is a block diagram of a third embodiment of an ultrasound imaging system that employs the adaptive filter of FIG. 2A or FIG. 2B.

A third embodiment of the ultrasound imaging system that employs the adaptive filter 60 (60*a* or 60*b* of respective FIGS. 2A and 2B) of the present invention is shown in FIG. 4 by way of a functional block diagram and is generally denoted by reference numeral 10*c*. The discussion previously regarding elements/features having like reference numerals is incorporated here by reference and is applicable to the third embodiment.

As is shown in FIG. 4, in this third embodiment, the adaptive filter 60 (60*a* or 60*b* of FIGS. 2A and 2B, respectively) is interposed between the amplitude detector 34 and the log mechanism 38. The adaptive filter 60 receives the amplitude-detected acoustic lines 36 from the amplitude detector 34, modifies them pursuant to the transfer function defined by the shaping algorithm 72, and outputs modified lines 36' to the log mechanism 38.

Furthermore, in this third embodiment of the ultrasound imaging system, the RF filter 27 and/or the post-log filter 41 may be replaced with an adaptive filter 60 and operated in combination with the adaptive filter 60 situated between the amplitude detector 34 and the log mechanism 38.

D. Fourth Embodiment of Ultrasound Imaging System

Figure 5:
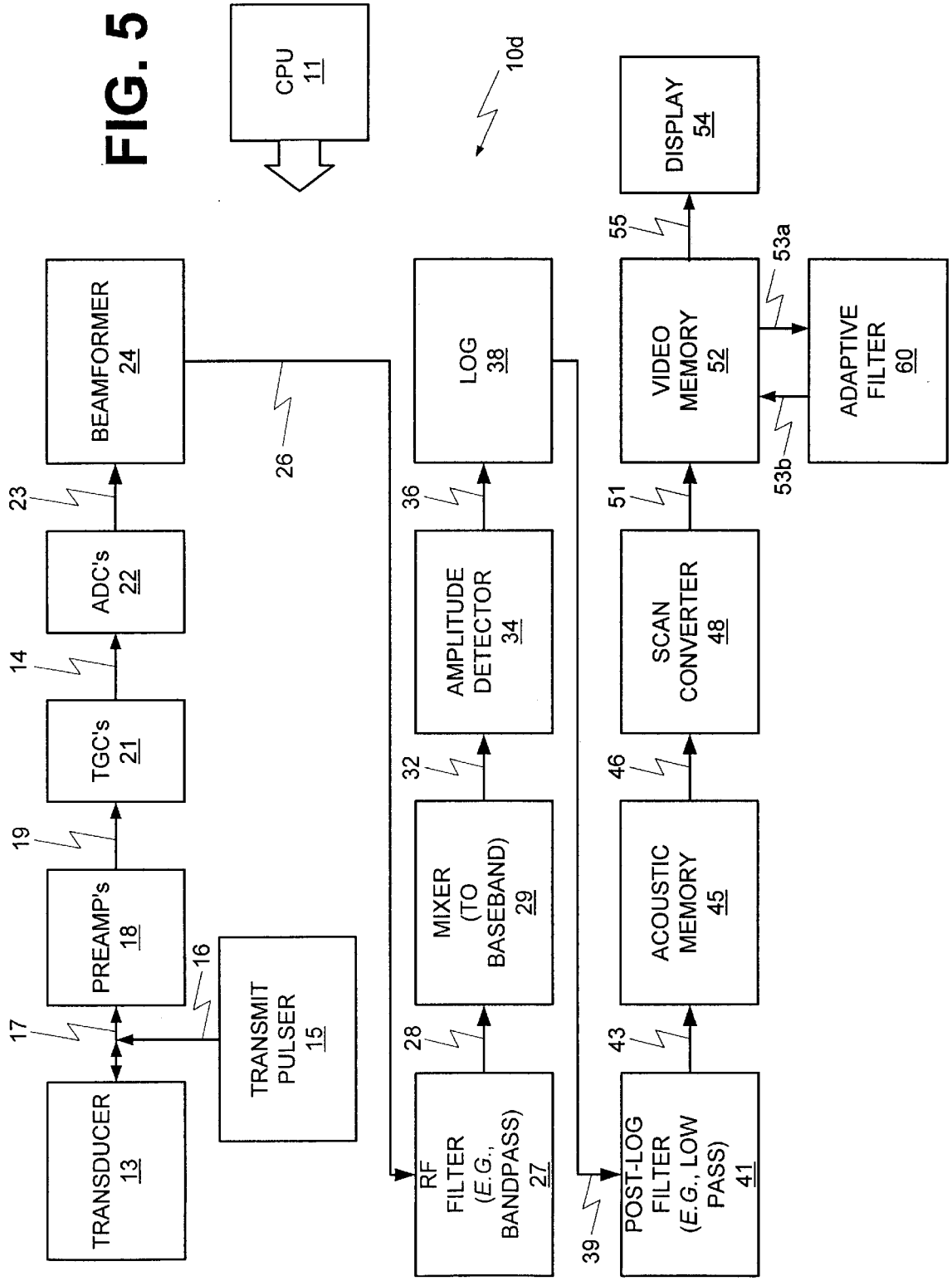
FIG. 5 is a block diagram of a fourth embodiment of an ultrasound imaging system that employs the adaptive filter of FIG. 2A or FIG. 2B.

A fourth embodiment of the ultrasound imaging system that employs the adaptive filter 60 (60*a* or 60*b* of respective FIGS. 2A and 2B) of the present invention is shown in FIG. 5 by way of a functional block diagram and is generally denoted by reference numeral 10*d*. The discussion previously regarding elements/features having like reference numerals is incorporated here by reference and is applicable to the fourth embodiment.

As is shown in FIG. 5, in this fourth embodiment, the adaptive filter 60 (60*a* or 60*b* of FIGS. 2A and 2B, respectively) is connected to the video memory. The adaptive filter 60 reads the scan converted data 53*a* from the video memory 52, modifies the data 53*a* pursuant to the transfer function defined by the shaping algorithm 72, produces adaptively filtered scan converted data 53*b* for the display 54, and stores the filtered data 53*b* back in the video memory 52 or some other suitable memory (not shown). In this configuration, the adaptive filter 60 can perform two-dimensional filtering, unlike the one-dimensional (i.e., along the acoustic line axis) adaptive filtering processes that have been described earlier. Since the data 53 is scan converted, a 2D adaptive filter 60 has consistent behavior over the entire image. The adaptive filter 60 in this configuration can perform at least the following filtering functions on the data to be displayed: speckle reduction, edge enhancement, and grayscale modification to enhance contrast.

In addition, in this ultrasound imaging system 10*d*, an adaptive filter 60 may be implemented (a) in the position of the RF filter 27 and/or (b) in the position of the post-log filter 41 and/or (c) between the amplitude detector 34 and the log mechanism 38, and operated in combination with the adaptive filter 60 situated between the amplitude detector 34 and the log mechanism 38.

II. Implementation/Operation Examples

In order to better understand specific implementations and operation of the first, second, third, and fourth embodiments of the ultrasound imaging system of the present invention as well as the first and second embodiments of the adaptive filters in accordance with the present invention, two hypothetical examples will be described hereafter.

A. First Hypothetical Example

In this first hypothetical example, the adaptive filter 60 situated between the beamformer 24 and the mixer 29, as described relative to the first embodiment of the ultrasound imaging system (denoted by reference numeral 10*a* in FIG. 1), is at issue. A reasonable goal for the output statistics of the pre-detection RF adaptive filter 60 (FIG. 1) is to achieve the narrowest time auto-correlation with negligible range sidelobes and adequate signal to-noise ratio. Gaussian functions are very useful for this because the Fourier transform of a Gaussian function is a Gaussian function, giving smooth, compact, non-negative, low-sidelobe characteristics in both time and frequency domains. A wider bandwidth Gaussian frequency spectrum makes a narrower Gaussian time auto-correlation, but it also degrades the signal-to-noise ratio because the signal is only stronger than the noise over a limited bandwidth. So the goal for the adaptive filter 60 could be to achieve the widest bandwidth Gaussian spectrum for a specified signal-to-noise ratio, given the input spectrum.

Because of frequency dependent attenuation, the deepest region of the image is usually where the signal statistics, such as bandwidth and signal-to-noise ratio, are least optimum. So for this example, assume that the data and filter coefficients $C_i$ correspond to the deepest region of the image. Also assume that regions of the image where most of the data is below an amplitude threshold (large regions of blood or cyst) are excluded from the coefficient calculations or are used for separate calculations.

First, with reference to FIG. 6, the average axial frequency spectrum of the input data 26 (FIGS. 1, 2A, and 2B); (signal plus noise) is calculated by the shaping algorithm 72 (FIGS. 1, 2A, and 2B) of the adaptive filter 60 by any suitable method, for example, averaging and smoothing magnitudes of Fast Fourier Transforms (FFTs). The spectrum of input data 26 is then compared to the noise spectrum, obtained, for example, by a data acquisition with no corresponding transmit pulse or, as another example, as illustrated in FIG. 6, by connecting a straight line 83 between the noise levels at frequencies above and below the dominant part of the signal-plus-noise spectrum. The frequencies where the data spectrum 26 (signal plus noise) is 3 dB greater than the noise level define edges 85a, 85b of a frequency band; the signal-to-noise behavior can be approximated by assuming that the input data 26 consists of signal within this band and noise outside this band.

Given this frequency band defined between edges 85a, 85b where the signal 26 is dominant over the noise, a Gaussian frequency function is sought that is as wide as possible, while keeping the fraction of power in the tails (noise) at a specified level 87. The center (mean) of the Gaussian function will be the center of the signal's frequency band. The standard deviation of the Gaussian function for a certain fraction of power in the tails can be obtained using the complementary error function erfc(x) as follows:

$$\mathrm{erfc}(x) = \frac{2}{\sqrt{\pi}} \int_x^\infty \exp(-t^2)\,dt$$

FIG. 7 is a graph of ½x vs. −10* log (erfc(x)) for 1<x<3. Values corresponding to the foregoing function can be stored in a look-up table associated with the shaping algorithm 72 in the controller 69 or can be derived via suitable logic, either in hardware, software, or a combination thereof. The trace 89 in the graph of FIG. 7 shows (along the vertical axis) the factor for multiplying the signal frequency span to obtain the Gaussian spectrum standard deviation versus (along the horizontal axis) the desired output signal-to-noise ratio in dB. This assumes abrupt transitions between signal and noise in the frequency domain, probably a reasonable approximation in most cases. If more precision is needed, the actual shape of the data and noise spectrums can be combined with the Gaussian shape to calculate the signal-to-noise ratio (that is, integrate GN/D, where G is the Gaussian shape, N is the noise spectrum, and D is the data spectrum).

With reference to FIG. 8, with the mean and standard deviation that specify the desired Gaussian spectrum 91 of the filtered output data 65 (FIGS. 1, 2A, and 2B), and with the input data 26, the optimal filter transfer function H(f) can be calculated by dividing the desired Gaussian spectrum 91 by the input data 26. The optimal filter transfer function H(f) is illustrated in FIG. 9 and denoted by reference numeral 92.

Furthermore, the optimal filter coefficients $C_i$ can be computed by the shaping algorithm 72 as follows. First, An inverse FFT mathematical operation is performed on the transfer function H(f) in the frequency domain, as shown in FIG. 9 by reference numeral 92, in order to obtain the transfer function H(t) in the time domain, as shown in FIG. 10 by reference numeral 92'. Finally, the filter coefficients $C_i$ are computed by the shaping algorithm 72 by sampling the transfer function H(t) at a rate corresponding to the digital filter 62 (FIGS. 2A or 2B).

The gain of the adaptive filter 60 can be normalized by setting the largest coefficient to the maximum value to minimize quantization errors (for, for example, fixed-point arithmetic filters). In this example, magnitude spectrums that are symmetric are utilized for positive and negative frequency, so that the resulting filter coefficients are real and symmetric. If the phase of the input data spectrum were included, then the resulting filter coefficients would be asymmetric real; this could potentially improve the desired statistics associated with the output data 65, but requires a slightly more complicated digital filter 62.

Since the tails of the desired Gaussian frequency spectrum 91 are predominantly noise, it could be argued that the adaptive filter 60 would be more optimum if it exhibited more attenuation at these frequencies. Although this would improve the signal-to-noise ratio, it would also significantly degrade the range sidelobes in the time domain. The goal of this example is to optimize the compactness of the time autocorrelation, subject to a signal-to-noise ratio constraint.

If the same filter coefficients are used in regions of the image where the signal is very weak, such as in a blood region or a cyst region, then the output data 28 will be mainly filtered noise. The filtered noise will have the same spectral shape as the filter frequency response, or filter transfer function H(f), which is generally a wider bandwidth than the spectrum of the filtered signal. So regions of the image where noise predominates will have a finer texture, and also more changes from frame to frame, which provides opportunities for more filtering downstream to improve perceived signal-to-noise ratio. Also, since the bandwidth of the RF signal which is above the noise level becomes narrower as the signal becomes weaker, it could be advantageous to have multiple sets of filter coefficients, such that the filter bandwidth depends on signal-to-noise ratio at any particular area in the image (not just dependent on the average degradation of signal-to-noise ratio with increasing depth).

As mentioned earlier, the signal statistics tend to be the worst at the deepest regions in the image. In other words, for this example, with a signal-to-noise ratio constraint, the output Gaussian bandwidth will be narrowest for the deepest regions, giving a relatively blobby speckle pattern. Users do not necessarily want the system response to be optimized at the shallower regions of the image, where the signal strength would permit a wider bandwidth—they may prefer a speckle size which is approximately uniform over the whole image. If this is the case, then other output statistics can be improved at shallower depths. For example, in progressing from the deepest region to shallower regions, the output bandwidth could be increased by up to 20%, then the output signal-to-noise ratio could be improved by up to 6 dB, then the output center frequency could be increased above the center of the input signal frequency range to sharpen the lateral focus. Alternatively, if the post-log filter is also controlled by the DSP, then the speckle size could be kept constant over the image while the speckle amplitude is reduced at shallower depths.

III. Second Hypothetical Example

In this second hypothetical example, the adaptive filter 60 situated after the log mechanism 38, as discussed previously relative to the second embodiment of the ultrasound imaging system (denoted by reference numeral 10b in FIG. 3), is at issue. After the beamformed receive signal 26 is filtered, detected, and logged, there is typically a low-pass post-log filter. This post-log filter softens the harsh appearance of the speckle caused by the log nonlinearity, reduces aliasing, slightly improves the signal-to-noise ratio, and also is an important factor in the trade-off between spatial resolution and contrast resolution. That is, the filter averages localized regions, which reduces the amplitude variance (power) of the speckle, making slight variations in average intensity easier to resolve, but the filtered speckle that remains consists of the blobbier lower spatial frequencies, making small spatial variations harder to resolve. The signal-to-noise ratio can be slightly improved by the post-log filter because the noise usually has a wider bandwidth than the signal.

To preserve the average intensity of the image, the post-log filter should have a gain of 1.0 at DC (zero frequency). The log data is non-negative, so the post-log filter should include suitable output clipping at zero and fill-scale. Because the log nonlinearity greatly increases the high-frequency power, the data should not be decimated until after the post-log filter to avoid aliasing, and the filter should eliminate frequency components above half the ultimate sample rate.

The trade-off between spatial resolution and contrast resolution is something that the system user/operator might want to manually adjust. Alternatively, it could be preset by the system based on a selection of exam type, such as cardiac, peripheral vascular, obstetric, etc. Further, the post-log adaptive filter 60 (FIG. 3) can constrain one resolution parameter and optimize the other, or optimize a weighted combination of both parameters. This example will assume that the spatial resolution is a constraint; that is, the average speckle size will be the same over the entire image, and the contrast resolution will be optimized given this constraint.

Specifying the spatial resolution is equivalent to specifying the bandwidth of the filtered post-log signal 39 (FIG. 3). As in the previous hypothetical example, it is generally desirable that the output data statistics be smooth and compact in both time and frequency. Time sidelobes degrade the image by causing "leakage" of strong signals into nearby areas. Frequency sidelobes degrade the image by causing aliasing in the decimation that typically follows the typical post log filter, creating a harsh, shimmering, retrograde-motion haze. A Gaussian shape has the desired characteristics of smoothness and compactness in both domains.

Referring to FIG. 11, the desired Gaussian spectrum 96 of the data output 65 is determined by its zero frequency mean and specified bandwidth. The amplitude does not matter at this point. Dividing this Gaussian spectrum 96 by the frequency spectrum 94 of the post-log input data 64 (obtained by averaging and smoothing FFTs) gives the frequency response, or transfer function H(f), of the post-log adaptive filter 60, which is shown in FIG. 12 and generally denoted by reference numeral 98. An inverse FFT of this frequency response H(f) gives the transfer function h(t) in the time domain, as illustrated in FIG. 13 by reference numeral 99. The optimal filter coefficients are obtained by sampling the transfer function h(t).

It tends to be easier and more accurate to ignore the gain and the near-DC component of the data in the frequency domain calculations, and just normalize the sum of the time domain filter coefficients to 1.0. Calculations which ignore the phase of the input data spectrum will produce filter coefficients which are real and symmetric. Including phase produces asymmetric real coefficients.

It should be emphasized that the above-described embodiments of the present invention, particularly, any "preferred" embodiment(s), are merely possible examples of implementations that are merely set forth for a clear understanding of the principles of the invention. Furthermore, many variations and modifications may be made to the above-described embodiments of the invention without departing substantially from the spirit and principles of the invention. For example, the adaptive filter 60 could be implemented, although not optimally, with an analog filter that has a transfer function that is adjustable by manipulating analog filter parameters associated therewith. Along these lines, generally, the entire previous discussion regarding generation and manipulation of "coefficients" is also applicable to "parameters" in context of an analog filter. All such modifications and variations are intended to be taught by the present disclosure, included within the scope of the present invention, and protected by the following claims.

Therefore, at least the following is claimed:

1. An ultrasound imaging system, comprising:

an adaptive filter configured to receive input signals and modify the input signals to produce output signals based upon a transfer function, the transfer function being definable by one or more filter parameters that are provided to the adaptive filter; and a controller configured to generate the filter parameters based upon a signal constraint communicated to the controller and a sample signal exhibiting a sample signal statistic, the sample signal being one of the input or output signals, the controller configured to communicate the filter parameters to the adaptive filter, the filter parameters causing the adaptive filter to produce an output signal that exhibits an approximation of a desired signal statistic, the desired signal statistic based upon the sample signal statistic and the signal constraint.

2. The system of claim 1, wherein the adaptive filter is a digital filter, the input and output signals correspond to digitized acoustic lines of data, and the filter parameters are filter coefficients.

3. The system of claim 2, wherein the controller is a digital signal processor.

4. The system of claim 1, wherein the adaptive filter is an analog filter and the input and output signals correspond to analog acoustic lines.

5. The system of claim 1, further comprising:

a beamformer in electrical communication with the adaptive filter, the beamformer designed to provide the input signals to the adaptive filter.

6. The system of claim 1, further comprising:

a log mechanism in electrical communication with the adaptive filter, the log mechanism designed to impose a logarithm transfer function upon received signals, the log mechanism designed to provide the input signals to the adaptive filter.

7. The system of claim 1, further comprising:

an amplitude detector in electrical communication with the adaptive filter, the amplitude detector designed to provide the input signals to the adaptive filter.

8. The system of claim 1, further comprising:

a memory storing scan converted data for display, the memory being in electrical communication with the adaptive filter and designed to provide the input signals to the adaptive filter.

9. The system of claim 1, wherein the controller is configured to automatically and periodically update the filter parameters by periodically analyzing the input or output signals.

10. The system of claim 1, wherein the controller is configured to calculate the filter parameters by:

analyzing a first input or output signal;

determining noise data based upon the first input or output signal;

analyzing a second input or output signal; and adapting the filter parameters based upon the noise data and the second input or output signal.

11. The system of claim 1, further comprising an input mechanism in communication with the controller and enabling an operator to define signal constraints.

12. The system of claim 1, wherein the controller is configured to automatically detect a change in transducer type by analyzing another sample signal and modify the parameters based upon the change.

13. The system of claim 1, wherein the controller is configured to automatically detect a change in examination type by analyzing another sample signal and modify the parameters based upon the change.

14. The system of claim 1, wherein the controller is configured to automatically detect a change in depth range by analyzing another sample signal and to provide to the adaptive filter different filter parameters for regions located at different depths in an object under test.

15. The system of claim 1, wherein the controller is configured to provide to the filter different filter parameters for different spatial regions of an object under test.

16. The system of claim 1, wherein the controller is configured to provide different filter parameters to the adaptive filter for spatial regions exhibiting different amplitudes on the input or output signals.

17. The system of claim 1, wherein the controller is configured to derive the filter parameters based upon a weighted combination of a plurality of signal constraints.

18. The system of claim 1, wherein the controller is configured to optimize one signal constraint subject to another signal constraint on another statistic.

19. The system of claim 1, wherein the adaptive filter is controlled by the controller to filter, generally in parallel, a plurality of independent streams of input signals using a single coefficient set.

20. An ultrasound imaging system, comprising:

an adaptive filter means for receiving input signals and modifying the input signals to produce output signals based upon a transfer function, the transfer function being definable by one or more filter parameters that are provided to the adaptive filter; and a controller means for generating the filter parameters based upon a signal constraint communicated to the controller and a sample signal exhibiting a sample signal statistic, the sample signal being one of the input or output signals, the controller for communicating the filter parameters to the adaptive filter, the filter parameters causing the adaptive filter to produce an output signal that exhibits an approximation of a desired signal statistic, the desired signal statistic based upon the sample signal statistic and the signal constraint.

21. A method for ultrasound imaging, comprising the steps of:

receiving a signal constraint;

receiving a sample signal having a sample signal statistic;

generating one or more filter parameters based upon the signal constraint and the sample signal statistic;

communicating the filter parameters to an adaptive filter; and modifying an input signal to the adaptive filter based upon the filter parameters to produce an output signal that exhibits an approximation of a desired signal statistic, the desired signal statistic based upon the sample signal statistic and the signal constraint.

22. The method of claim 21, wherein the input signal is modified based upon a transfer function.

23. The method of claim 21, wherein the filter parameters are filter coefficients.

24. The method of claim 21, wherein the filter parameters are determined by:

analyzing a first input or output signal;

determining noise data based upon the first input or output signal;

analyzing a second input or output signal; and adapting the filter parameters based upon the noise data and the second input or output signal.

* * * * *